US012522755B2

(12) United States Patent
Yang et al.

(10) Patent No.: US 12,522,755 B2
(45) Date of Patent: Jan. 13, 2026

(54) INTRINSICALLY REVERSIBLE SUPERGLUES

(71) Applicants: THE TRUSTEES OF THE UNIVERSITY OF PENNSYLVANIA, Philadelphia, PA (US); Lehigh University, Bethlehem, PA (US)

(72) Inventors: Shu Yang, Blue Bell, PA (US); Jason Christopher Jolly, Philadelphia, PA (US); Gaoxiang Wu, Philadelphia, PA (US); Anand Jagota, Bethlehem, PA (US); Zhenping He, Chalfont, PA (US); Hyesung Cho, Philadelphia, PA (US)

(73) Assignees: THe Trustees of the University of Pennyslvania, Philadelphia, PA (US); Lehigh University, Bethlehem, PA (US)

( * ) Notice: Subject to any disclaimer, the term of this patent is extended or adjusted under 35 U.S.C. 154(b) by 1037 days.

(21) Appl. No.: 17/427,226

(22) PCT Filed: Jan. 31, 2020

(86) PCT No.: PCT/US2020/016198
§ 371 (c)(1),
(2) Date: Jul. 30, 2021

(87) PCT Pub. No.: WO2020/160463
PCT Pub. Date: Aug. 6, 2020

(65) Prior Publication Data
US 2022/0306914 A1    Sep. 29, 2022

Related U.S. Application Data

(60) Provisional application No. 62/799,784, filed on Feb. 1, 2019.

(51) Int. Cl.
*C09J 133/06* (2006.01)
*C08J 3/075* (2006.01)
(Continued)

(52) U.S. Cl.
CPC ........... *C09J 133/066* (2013.01); *C08J 3/075* (2013.01); *C08J 3/24* (2013.01); *C09J 11/06* (2013.01); *C08J 2333/10* (2013.01)

(58) Field of Classification Search
CPC ...... C09J 133/066; C09J 133/14; C09J 11/06; C08J 3/075; C08J 3/24; C08J 2333/10
See application file for complete search history.

(56) References Cited

U.S. PATENT DOCUMENTS 3,748,701 A    7/1973   De Mestral
2004/0266965 A1  12/2004   Holguin et al.
(Continued)

FOREIGN PATENT DOCUMENTS

WO    2008/100617 A1    8/2008

OTHER PUBLICATIONS

Bose et al., "Mechanical Properties of Ultrahigh Molecular Weight PHEMA Hydrogels Synthesized Using Initiated Chemical Vapor Deposition", Biomacromolecules vol. 11, pp. 2116-2122 (2010) (Year: 2010).*
(Continued)

*Primary Examiner* — Scott R. Walshon
(74) *Attorney, Agent, or Firm* — BakerHostetler

(57) ABSTRACT

An adhesive that includes a polymer network capable of conversion between two different elastic modulus states with essentially no residual stress evolved in conversion between the two different elastic modulus states, wherein the polymer network comprises either or both of (i) poly (2-hydroxy ethyl methacrylate) (PHEMA) hydrogel and/or a copoly-
(Continued)

mers thereof, and (ii) a shape memory polymer. The technology also concerns methods of using such adhesives.

8 Claims, 15 Drawing Sheets

(51) Int. Cl.
  *C08J 3/24* (2006.01)
  *C09J 11/06* (2006.01)

(56) References Cited

U.S. PATENT DOCUMENTS

2009/0280330 A1 11/2009 Xie et al.
2013/0165554 A1 6/2013 Weder et al.

OTHER PUBLICATIONS

Lin et al., "Studies on Swelling Behaviors, Mechanical Properties, Network Parameters and Thermodynamic Interaction of Water Sorption of 2-Hydroxyethyl Methacrylate/Novolac Epoxy Vinyl Ester Resin Copolymeric Hydrogels", Reactive & Functional Polymers vol. 67, pp. 789-797 (2007) (Year: 2007).*
Adams G & Nosonovsky M (2000) Contact modeling—forces. Tribology international 33(5-6):431-442.
Arzt E, Gorb S, & Spolenak R (2003) From micro to nano contacts in biological attachment devices. Proc. Nat. Acad. Sci. USA 100(19):10603-10606.
Autumn K (2007) Gecko adhesion: Structure, function, and applications. MRS Bull. 32(6):473-478.
Autumn K, et al. (2000) Adhesive force of a single gecko foot-hair. Nature 405(6787):681-685.
Baik S, et al. (2017) A wet-tolerant adhesive patch inspired by protuberances in suction cups of octopi. Nature 546(7658):396-400.
Bartlett MD & Crosby AJ (2014) High Capacity, Easy Release Adhesives From Renewable Materials. Adv. Mater. 26(21):3405-3409.
Bartlett MD, et al. (2012) Looking Beyond Fibrillar Features to Scale Gecko-Like Adhesion. Adv. Mater. 24(8):1078-1083.
Boesel LF, Greiner C, Arzt E, & del Campo A (2010) Gecko-Inspired Surfaces: A Path to Strong and Reversible Dry Adhesives. Adv. Mater. 22(19):2125-2137.
Chen C-M, Chiang C-L, Lai C-L, Xie T, & Yang S (2013) Buckling-Based Strong Dry Adhesives Via Interlocking. Adv. Funct. Mater. 23(30):3813-3823.
Chen Y-C & Yang H (2017) Octopus-inspired assembly of nanosucker arrays for dry/wet adhesion. ACS Nano 11(6):5332-5338.
Cho et al., Intrinsically reversible superglues via shape adaptation inspired by snail epiphragm, PNAS, vol. 116, No. 28, Jul. 9, 2019, pp. 13774-13779.
Cho H, et al. (2015) Multiplex lithography for multilevel multiscale architectures and its application to polymer electrolyte membrane fuel cell. Nat. Commun. 6, 8484.
Denny MW (1984) Mechanical-Properties of Pedal Mucus and Their Consequences for Gastropod Structure and Performance. Am. Zool. 24(1):23-36.
Eisenhaure J & Kim S (2014) An internally heated shape memory polymer dry adhesive. Polymers 6(8):2274-2286.
Eisenhaure JD, Xie T, Varghese S, & Kim S (2013) Microstructured shape memory polymer surfaces with reversible dry adhesion. ACS Appl. Mater. Interfaces 5(16):7714-7717.
Ge L, Sethi S, Ci L, Ajayan PM, & Dhinojwala A (2007) Carbon nanotube-based synthetic gecko tapes. Proc. Nat. Acad. Sci. USA 104(26):10792-10795.
Giokas S, Pafilis P, & Valakos E (2005) Ecological and physiological adaptations of the land snail Albinaria caerulea (Pulmonata : Clausiliidae). J. Mollus. Stud. 71:15-23.
Glassmaker NJ, Jagota A, Hui C-Y, Noderer WL, & Chaudhury MK (2007) Biologically inspired crack trapping for enhanced adhesion. Proc. Natl. Acad. Sci. 104(26):10786-10791.
Gorb S, Varenberg M, Peressadko A, & Tuma J (2007) Biomimetic mushroom-shaped fibrillar adhesive microstructure. J R Soc Interface 4(13):271-275.
Guvendiren M, Burdick JA, & Yang S (2010) Solvent induced transition from wrinkles to creases in thin film gels with depth-wise crosslinking gradients. Soft Matter 6(22):5795-5801.
Guvendiren M, Heiney PA, & Yang S (2009) Precipitated Calcium Carbonate Hybrid Hydrogels: Structural and Mechanical Properties. Macromolecules 42(17):6606-6613.
Guvendiren M, Yang S, & Burdick JA (2009) Swelling-Induced Surface Patterns in Hydrogels with Gradient Crosslinking Density. Adv. Funct. Mater. 19(19):3038-3045.
Hawkes EW, Eason EV, Christensen DL, & Cutkosky MR (2015) Human climbing with efficiently scaled gecko-inspired dry adhesives. J R Soc Interface 12(102):20140675.
Henkel Corporation, Loctite® Super Glue Professional Technical Data Sheet. Accessed Jan. 2018.
Jagota A & Hui CY (2011) Adhesion, friction, and compliance of bio-mimetic and bio-inspired structured interfaces. Mat. Sci. Eng. R. 72(12):253-292.
Jeong HE, Lee JK, Kim HN, Moon SH, & Suh KY (2009) A nontransferring dry adhesive with hierarchical polymer nanohairs. Proc. Nat. Acad. Sci. USA 106(14):5639-5644.
Johnson K, Kendall K, & Roberts A (1971) Surface energy and the contact of elastic solids. Proc. R. Soc. Lond. A 324(1558):301-313.
Kim J, et al. (2017) Nonlinear frameworks for reversible and pluripotent wetting on topographic surfaces. Adv. Mater. 29(7):1605078.
Kim S & Sitti M (2006) Biologically inspired polymer microfibers with spatulate tips as repeatable fibrillar adhesives. Appl. Phys. Lett. 89(26):3.
Kim TI, Jeong HE, Suh KY, & Lee HH (2009) Stooped Nanohairs: Geometry-Controllable, Unidirectional, Reversible, and Robust Gecko-like Dry Adhesive. Adv. Mater. 21(22):2276-2281.
King DR, Bartlett MD, Gilman CA, Irschick DJ, & Crosby AJ (2014) Creating Gecko-Like Adhesives for "Real World" Surfaces. Adv. Mater. 26(25):4345-4351.
Ko H, et al. (2009) Hybrid Core-Shell Nanowire Forests as Self-Selective Chemical Connectors. Nano Lett. 9(5):2054-2058.
Kwak MK, et al. (2011) Towards the next level of bioinspired dry adhesives: new designs and applications. Adv. Funct. Mater. 21(19):3606-3616.
Li J, et al. (2017) Tough adhesives for diverse wet surfaces. Science 357(6349):378-381.
Lin PC, Vajpayee S, Jagota A, Hui CY, & Yang S (2008) Mechanically tunable dry adhesive from wrinkled elastomers. Soft Matter 4(9):1830-1835.
Long R, Hui C-Y, Kim S, & Sitti M (2008) Modeling the soft backing layer thickness effect on adhesion of elastic microfiber arrays. J. Appl. Phys. 104(4):044301.
Lu G, et al. (2008) Drying enhanced adhesion of polythiophene nanotubule arrays on smooth surfaces. ACS Nano 2(11):2342-2348.
Persson BNJ (2007) Biological adhesion for locomotion on rough surfaces: Basic principles and a theorist's view. MRS Bull. 32(6):486-490.
Qu LT, Dai LM, Stone M, Xia ZH, & Wang ZL (2008) Carbon nanotube arrays with strong shear binding-on and easy normal lifting-off. Science 322(5899):238-242.
Saito S, et al. (2016) Light-melt adhesive based on dynamic carbon frameworks in a columnar liquid-crystal phase. Nat. Commun. 7:12094.
Sun JY, et al. (2012) Highly stretchable and tough hydrogels. Nature 489(7414):133-136.
Vajpayee S, Hui C-Y, & Jagota A (2008) Model-independent extraction of adhesion energy from indentation experiments. Langmuir 24(17):9401-9409.
Vajpayee S, Khare K, Yang S, Hui C-Y, & Jagota A (2011) Adhesion Selectivity Using Rippled Surfaces. Adv. Funct. Mater. 21(3):547-555.
Wirthl D, et al. (2017) Instant tough bonding of hydrogels for soft machines and electronics. Sci. Adv. 3(6):e1700053.

(56) References Cited

OTHER PUBLICATIONS

Xu M, Du F, Ganguli S, Roy A, & Dai LM (2016) Carbon nanotube dry adhesives with temperature-enhanced adhesion over a large temperature range. Nat. Commun. 7:13450.
Yang J, Bai R, & Suo Z (2018) Topological Adhesion of Wet Materials. Adv. Mater. 30:1800671.
Yuk H, Zhang T, Lin ST, Parada GA, & Zhao XH (2016) Tough bonding of hydrogels to diverse non-porous surfaces. Nat. Mater. 15(2):190-196.

* cited by examiner

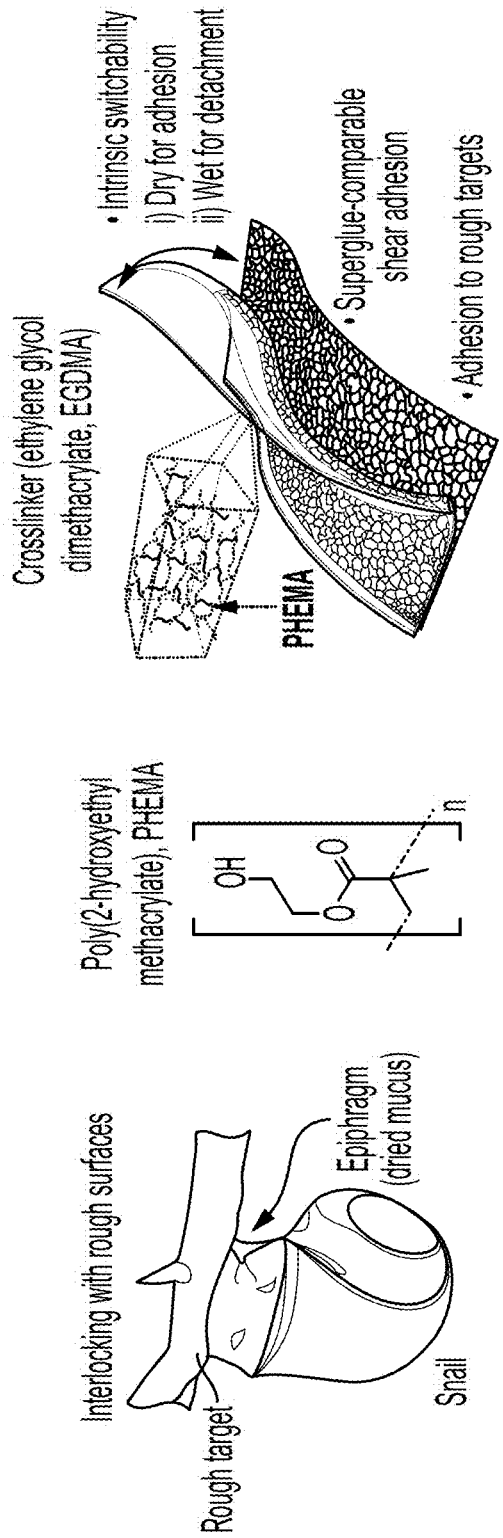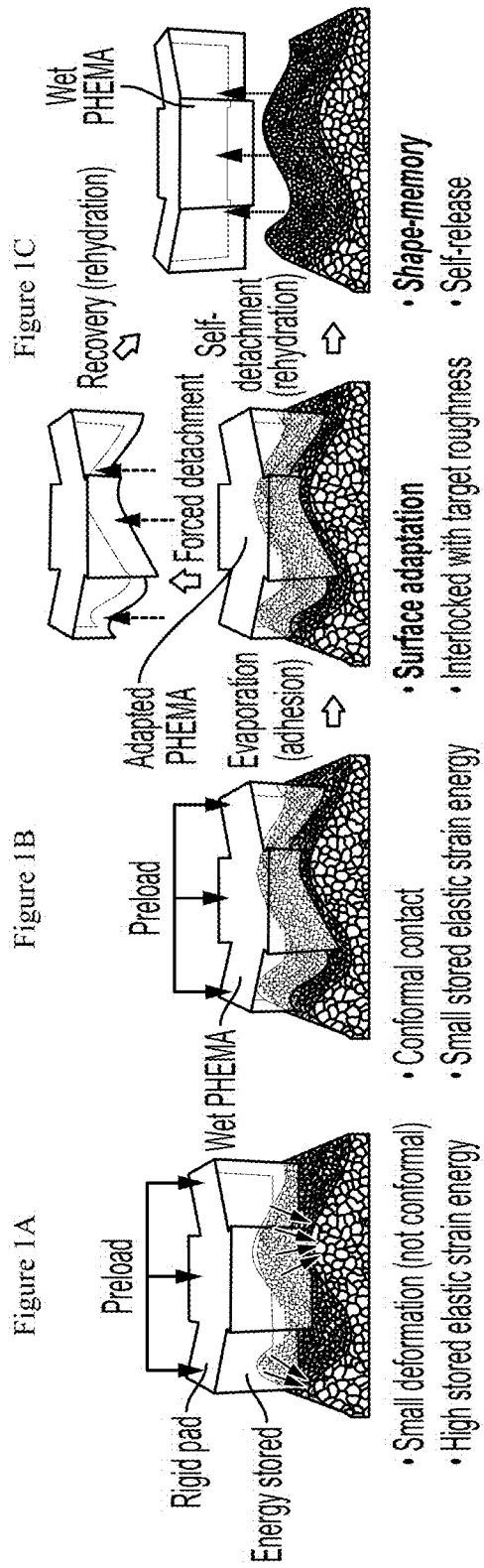
Figure 1A Figure 1B Figure 1C
Figure 1D Figure 1E

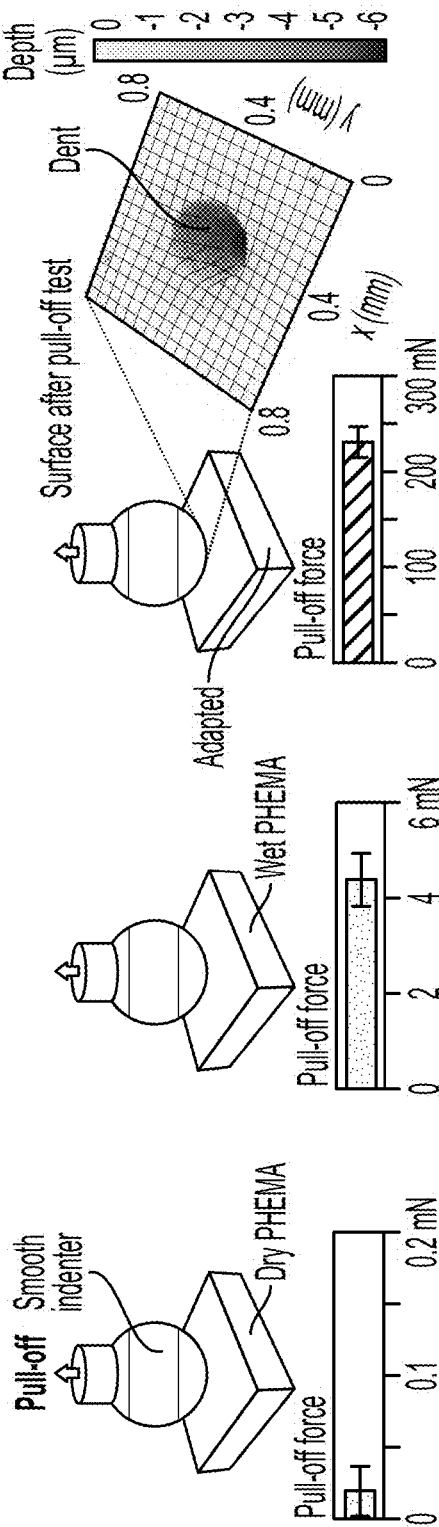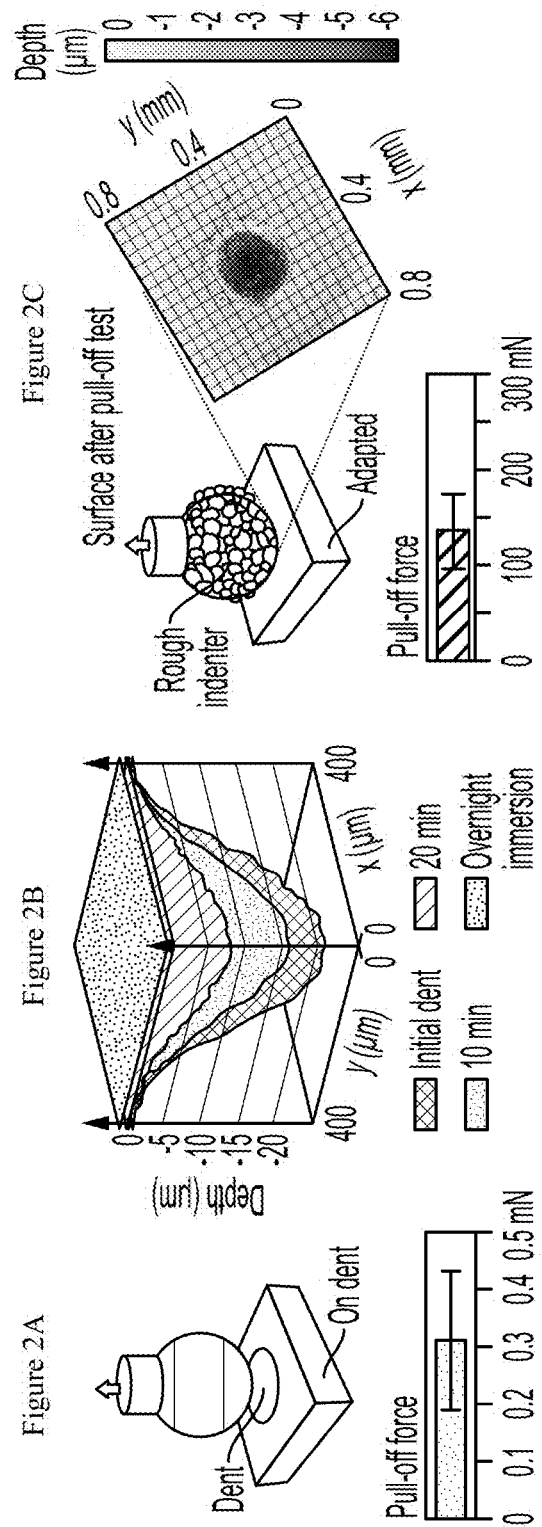
Figure 2A  Figure 2B  Figure 2C
Figure 2D  Figure 2E  Figure 2F

INTRINSICALLY REVERSIBLE SUPERGLUES

CROSS REFERENCE TO RELATED APPLICATIONS

This application is the National Stage Application of International Patent Application No. PCT/US2020/016198, filed Jan. 31, 2020, which claims the benefit of U.S. Provisional Application No. 62/799,784, filed Feb. 1, 2019, the disclosures of which foregoing applications are incorporated herein by reference in their entireties for any and all purposes.

GOVERNMENT RIGHTS

This invention was made with government support under DMR-1410253, EFRI-1331582 awarded by the NSF and DE-FG02-07ER46463 awarded by the Department of Energy. The government has certain rights in the invention.

TECHNICAL FIELD

The invention concerns intrinsically reversible superglues and methods of using same.

BACKGROUND

Adhesives are ubiquitous in daily life and industrial applications. They usually fall into one of two classes: strong but irreversible (e.g., superglues) or reversible/reusable but weak (e.g., pressure-sensitive adhesives and biological and biomimetic surfaces). Achieving both superstrong adhesion and reversibility has been challenging.

Adhesion between two bodies is mediated by their surface or near-surface properties, including (a) local chemistry that affects intrinsic adhesion at the molecular level, (b) microscopic surface roughness (topography), and (c) macroscopic material mechanical properties. Liquid adhesives used in large-scale applications including manufacturing, construction and assemblies, offer strong adhesion after curing (e.g., ~1,000 N cm$^{-2}$ from superglues with cyanoacrylate chemistry), but are not reworkable. Tough hydrogels have shown promise as a new class of adhesives with high interfacial toughness, e.g., via double interpenetrating networks consisting of both covalent and ionic crosslinks. Nevertheless, they are limited to a specific target material class, for use in a wet environment, and often require covalent bonding with the substrate. In comparison, the ability of geckos and some insects to reversibly cling to almost any surface is attributed to split contact adhesion from millions of hierarchical fibrillar structures on the attachment pads, which interact with surfaces via weak, van der Waals forces and/or capillary forces. However, the extrinsic adhesion strength of dry adhesives relying on surface structures is rather weak, rarely beyond 30 N cm$^{-2}$, and can be dramatically attenuated when in contact with a rough surface. Velcro® shows reversible adhesion with strength as high as 120 N cm$^{-2}$, arising from the collective mechanical interlocking of many small hooks and loops, detached simply by peeling. But interlocking adhesives require complementary structures on opposing surfaces to engage and interlock. There is a need in the art for adhesives that overcome the aforementioned defects.

SUMMARY

In some embodiments, the invention concerns adhesives comprising: a polymer network capable of conversion between two different elastic modulus states with essentially no residual stress evolved in conversion between the two different elastic modulus states, wherein the polymer network comprises either or both of (i) poly(2-hydroxyethyl methacrylate) (PHEMA) hydrogel and/or a copolymers thereof, and (ii) a shape memory polymer.

For some compositions, the PHEMA is copolymerized with one or more of poly(methyl methacrylate) (PMMA), poly(acrylic acid), poly(methacrylic acid), poly(N, N-isopropyl acrylamide), polyethylene glycol diacrylate (PEGDA), and polyethylene glycol dimethacrylate. (PEGDMA). In other compositions, the shape memory polymer comprises one or more of a bisphenol A based epoxy (such as EPON826) crosslinked by a polyether amine (such as Jeffamine D-230) and decylamine, ethylvinyl acetate (EVA), polyurethane, poly(ε-caprolactone) (PCL) and poly(cyclohexyl methacrylate) (PCHMA).

In some embodiments, the hydrogel's modulus increases by at least three orders of magnitude when dry versus wet. Some hydrogels have a Young's modulus 10-200 kPa, the dry gel should have modulus of 100 MPa to 10 GPa.

An important property of certain hydrogels is that when contacted with a substrate, substantially does not have a chemical reaction with the substrate.

Certain polymers further comprising a cross-linker in an amount of from about 2 vol % to about 10 vol %. One preferred crosslinker is ethylene glycol dimethacrylate (EGDMA).

The invention also concerns methods forming a reversible adhesive bond, comprising applying a wet poly(2-hydroxyethyl methacrylate) (pHEMA)-containing hydrogel to a substrate and then drying the hydrogel so as to form a hard adhesive. Such methods may further comprise wetting the hydrogel so as to de-adhere the hydrogel from the substrate.

In yet another aspect, the invention concerns methods of adhering a first article to a second article, the method comprising: applying an adhesive of the invention such that the adhesive contacts a surface of each of the first and second articles.

The invention also concerns methods comprising using an adhesive according to the invention to reversibly bond a first substrate to a second substrate. The methods may further comprise wetting the adhesive so as to de-adhere the hydrogel from at least one of the first or second substrates. The methods may also comprise further comprising drying the adhesive to as to increase the modulus of the adhesive.

BRIEF DESCRIPTION OF THE DRAWINGS

FIG. 1 illustrates the design of PHEMA hydrogel superglues. (a) Illustration of epiphragm of snails, where the drying mucus facilitates its attachment to a rough surface. (b) Chemical structure of poly (2-hydroxyethyl methacrylate) (PHEMA). (c) Illustration of the major advantages of PHEMA hydrogel adhesives in overcoming challenges posed by liquid and dry adhesives. (d) Illustration of the challenge in making conformal contact between a solid adhesive that has a high modulus and a rough target surface. (e) Proposed epiphragm-like adhesion mechanism with a PHEMA gel, where shape-conformability in the wet state followed by interlocking upon drying facilitates adhesion. The deformed configuration of the hydrogel can be retained after drying and forced detachment (shown by the blue arrows). Upon rehydration, the wet hydrogel adhesive pad returns to its original undeformed configuration, and can be easily self-detached from the target substrate (shown by the red arrows).

FIG. 2 presents indentation tests of a glass indenter to PHEMA hydrogel pads. (a-b) Schematic illustrations of the indentation tests performed with a smooth glass indenter to measure the pull-off forces from (a) dry and (b) wet PHEMA gel pads. (c) Indentation in the wet state, holding the indenter in place as the sample dries. Shape adaptation of the gel to the indenter results in a 50-fold increase in pull-off force and leaves a dent in the adhesive layer. (d) Repeated indentation of the dry and dented sample at the same spot as seen in (c). (e) Shape recovery kinetic process upon rehydration of a 22 µm deep indenter left behind in a PHEMA sample. (f) Indentation from a rough indenter showing the same shape adaption of the gel with somewhat attenuated pull-off forces compared to the smooth indenter in (c).

provides an estimate 34.9 MPa for the Young's modulus.

Figure 7A:
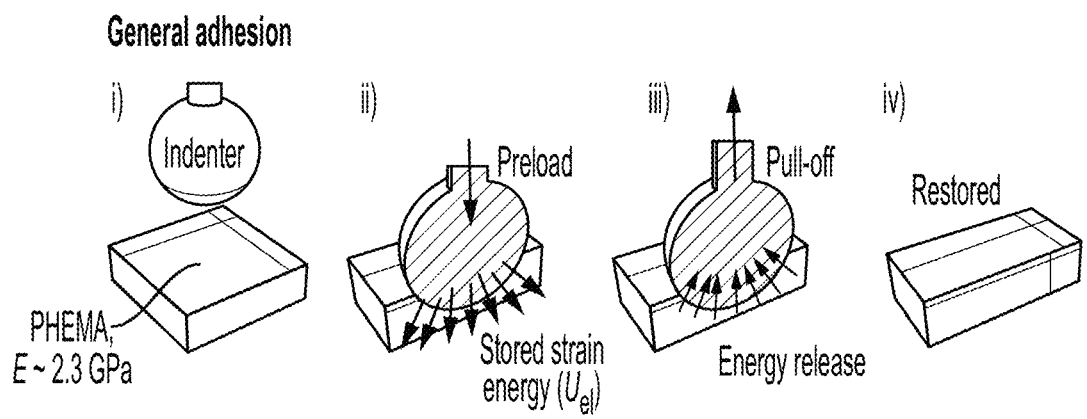
Figure 7B:
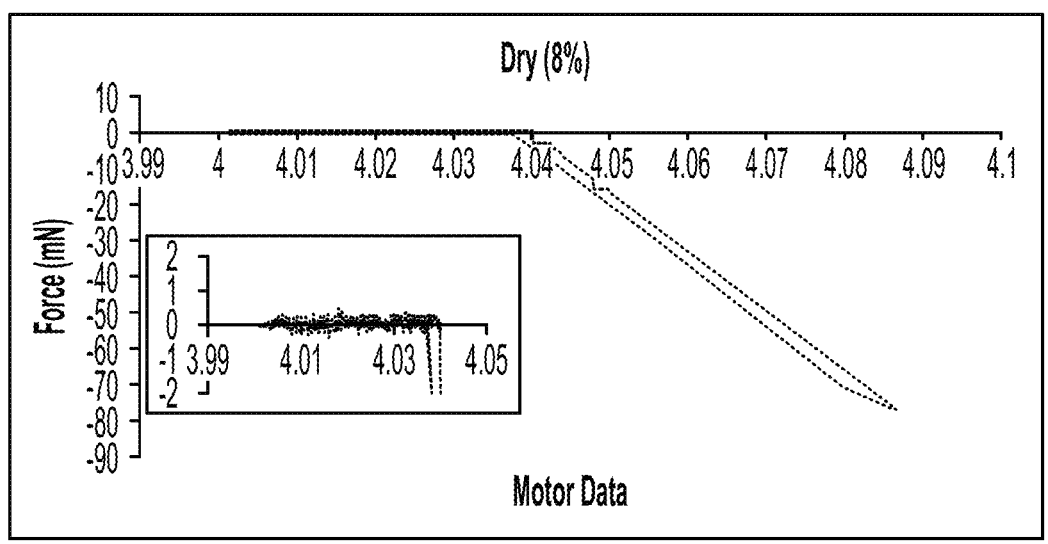

FIG. 7 shows indentation on a dried PHEMA gel (with 8 vol % EDGMA) surface as a control. (a) An exaggerated illustration of a simple adhesion test via indentation performed on a dry, rigid PHEMA sample that does not exhibit any shape-memory. (b) Indentation experiments show no significant adhesion strength measured upon pull-off dry PHEMA gel.

Figure 8:
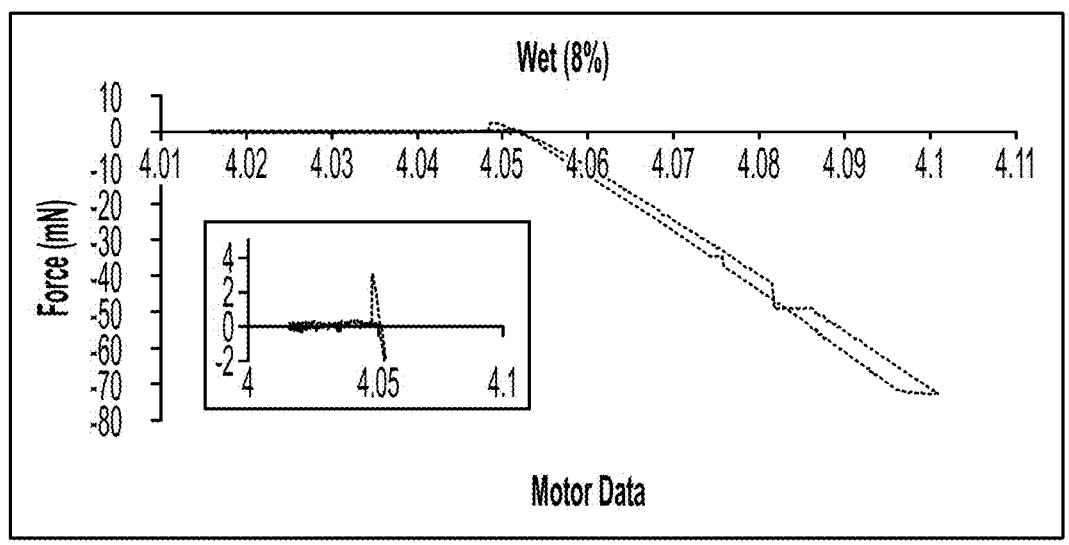

FIG. 8 shows indentation on wet PHEMA surface (with 8 vol % EDGMA) as another control. The measured pull-off forces are slightly larger than those measured from the dry control sample but still about two orders of magnitude smaller than those measured after shape adaption upon in situ drying is allowed to occur.

Figure 9:
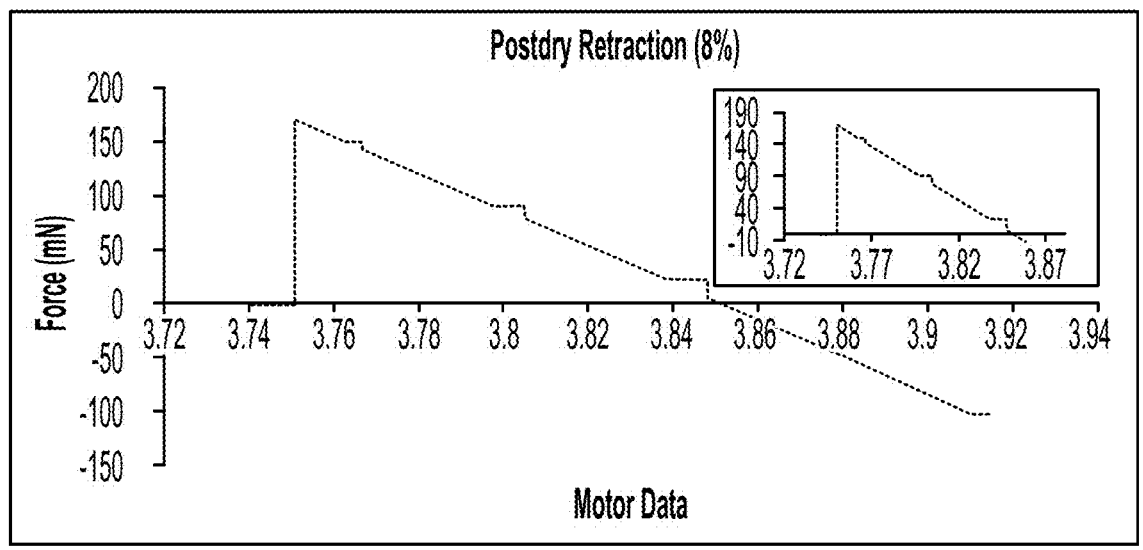
Figure 10A:
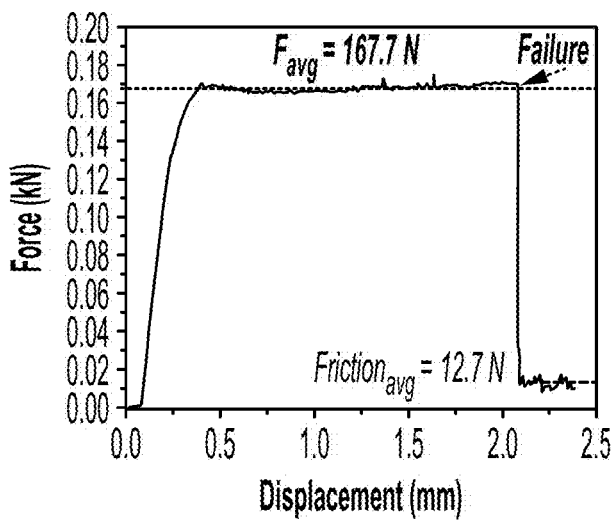
Figure 10B:
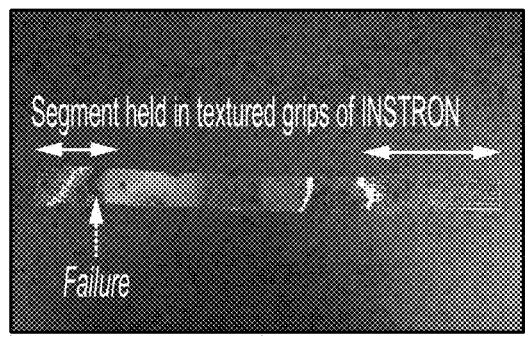
Figure 10C:
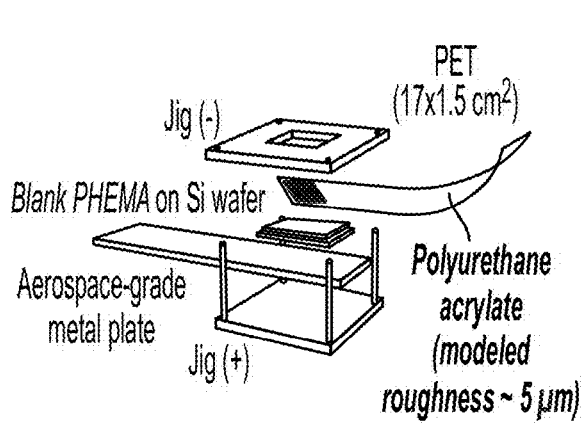
Figure 10D:
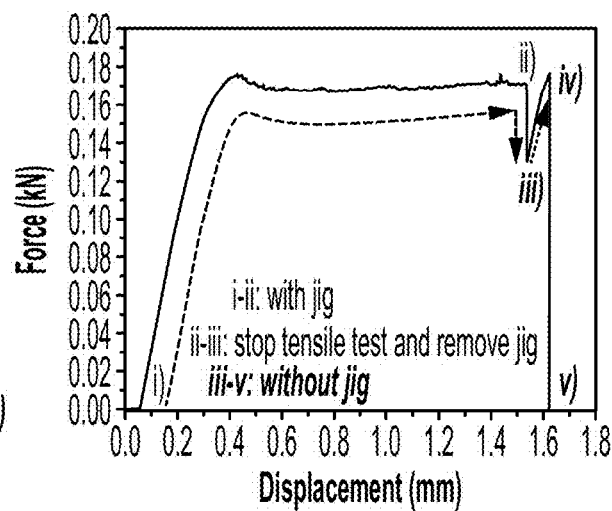
Figure 10E:
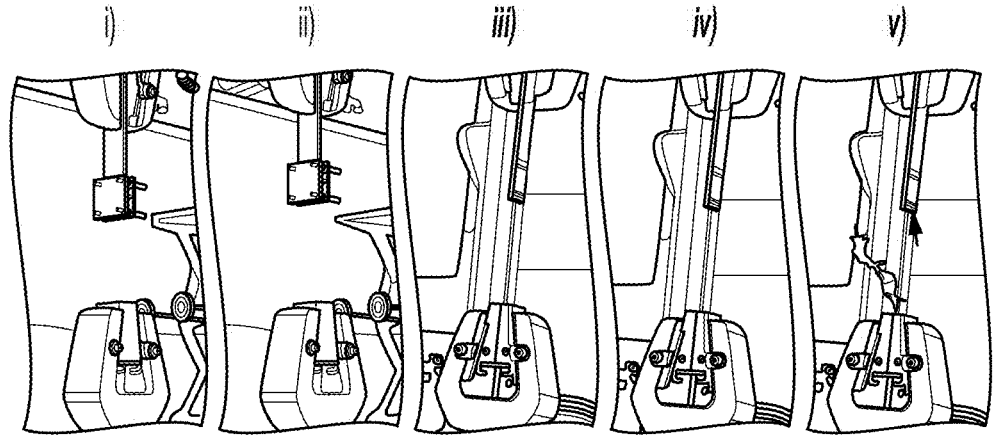

FIG. 9 shows indentation performed by drying a wet PHEMA sample (with 8 vol % EDGMA) held in contact with an indenter under an applied preload. Significantly, the measured pull-off forces in this case are about two orders of magnitude higher than those measured on the controls as described earlier.

FIG. 10 shows failure of PET film. (a-b) A PET film tested in tension using an INSTRON®, showing plastic deformation and fracture. Load-displacement curves, suggesting that a PET film would be ill-suited as a backbone of any adhesive system subjected to and capable of withstanding maximum loads exceeding ~160 N. (c-d) Failure of a PET film with a rough polyurethane acrylate (PUA) surface adhering, via an adhesive PHEMA superglue film, to a Si wafer that is in turn affixed to a metal plate (c). Results of the tensile test (load-displacement curves) (d). (e) Initially, the compression jig used to maintain conformal contact of the mating surface with the adhesive during the drying process was not removed for the first part of the tensile test (from i to ii). This was done to avoid prestressing the sample prior to testing and also served to minimize loading in opening and out-of-plane shear modes i.e., to test the sample in pure shear. After a point, the tensile test was paused, and the jig was disassembled while the sample was kept in tension. When the test was resumed, the applied tensile load (from iii to iv), caused the failure of the PET film (v). Note that adhesion and the adhesive interface was unaffected and survived the failure of the PET backbone.

FIG. 11 presents observation of shape adaption behavior in a PHEMA adhesive pad when forced to detach from a model rough target consisting of a square array of PUA micropillars. (a) PET backbone with PUA micropillars as described in FIG. 10, showed evidence of necking. When pulled in tension, sample failure was observed in the PET film and at the edge of the area in contact with the adhesive. (b) Illustration of the sample shown in (a). Evidence of shape adaption and shape memory behaviors in a PHEMA adhesive pad when forced to detach from a model rough target, a PUA micropillar array (5 µm in diameter and height and 10 µm in spacing) attached to a PET substrate. Insets: SEM images of the PUA micropillars (left) and the dents left in the PHEMA adhesive (right).

Figure 12:
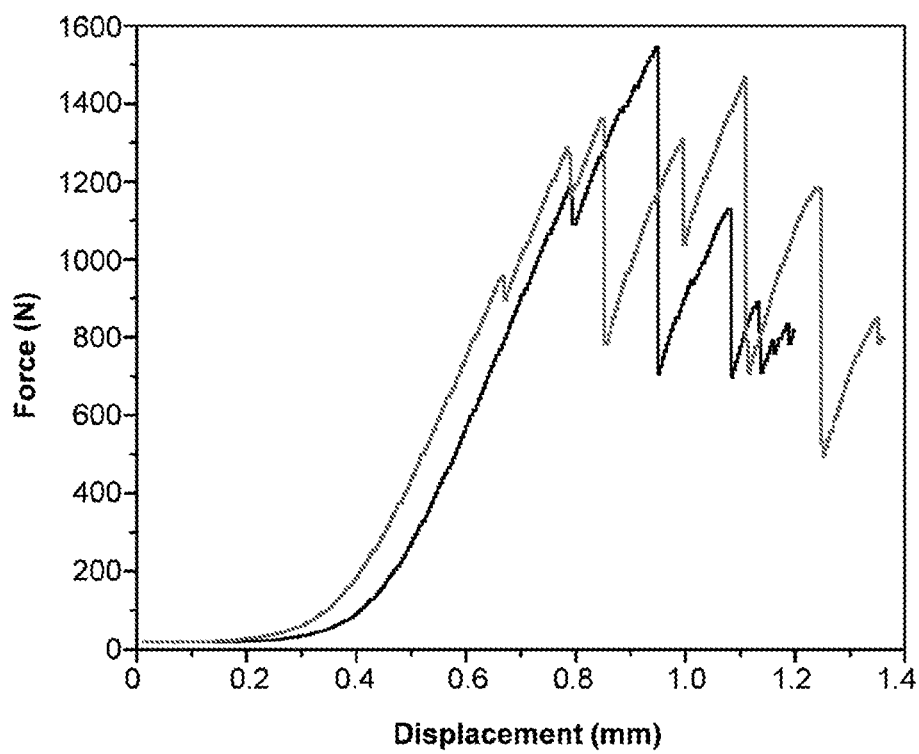

FIG. 12 presents tensile tests of a single Kevlar® strap as a control, performed using an INSTRON®. The similar load-displacement curves from the two independent measurements made, suggest that the usage of Kevlar® as a low compliance (in-plane, tensile) tendon in this study, is valid up to a maximum shear adhesion force of ~1100 N. Beyond this point, multiple local failure events are observed in the woven Kevlar® tendon. Hence, the double-lap test setup employed in this work utilizes Kevlar tendons—which are sufficiently compliant when subjected to twisting or bending so as to minimize the effect of test setup misalignments and out-of-plane torsional stresses, while at the same time exhibiting low compliance when pulled in tension and not detracting from the system's low overall compliance. This allows us to reliably probe the force capacity of our hydrogel superglues.

Figure 13A:
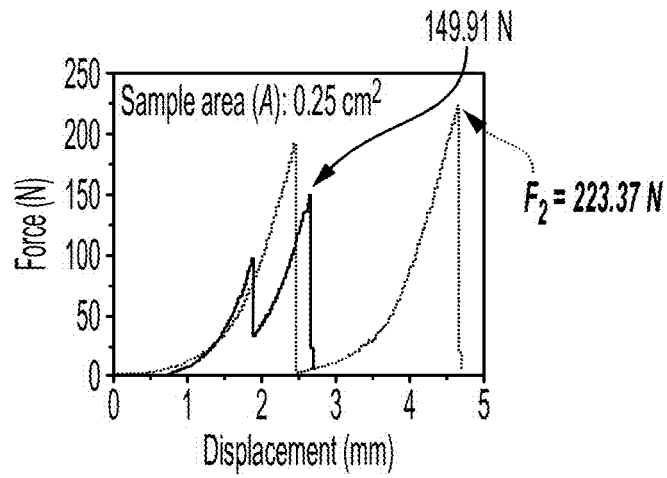
Figure 13B:
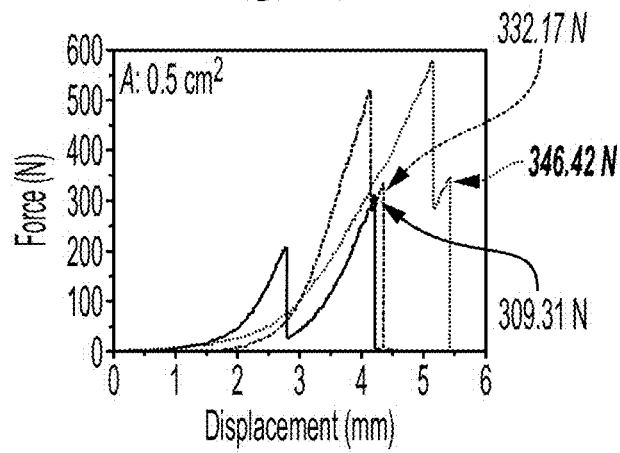
Figure 13C:
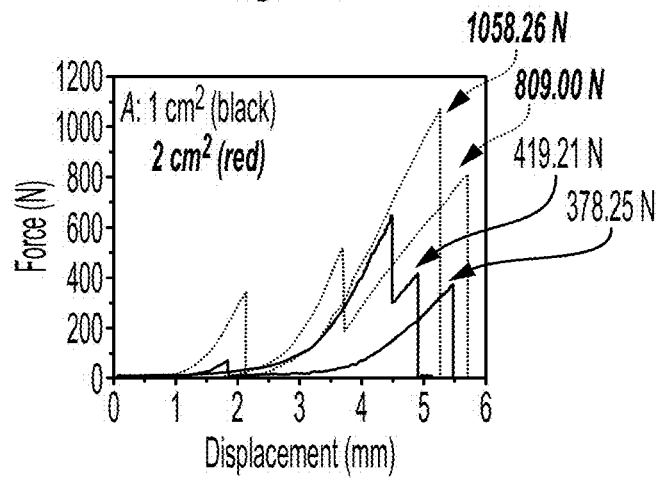

FIG. 13 presents Examples of force-displacement curves from the shear adhesion measurements performed on the double-lap test setup using an INSTRON® universal testing machine. The tested sample areas were 0.25, 0.5, 1, and 2 cm², respectively.

Figures 14A, 14B:
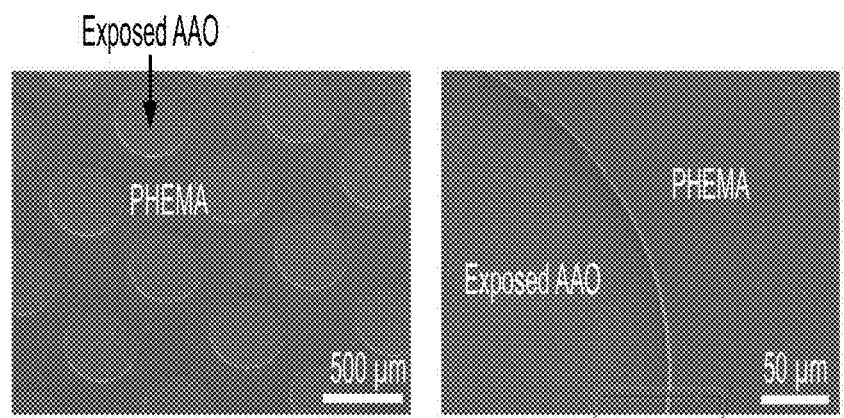
Figures 14C, 14D:
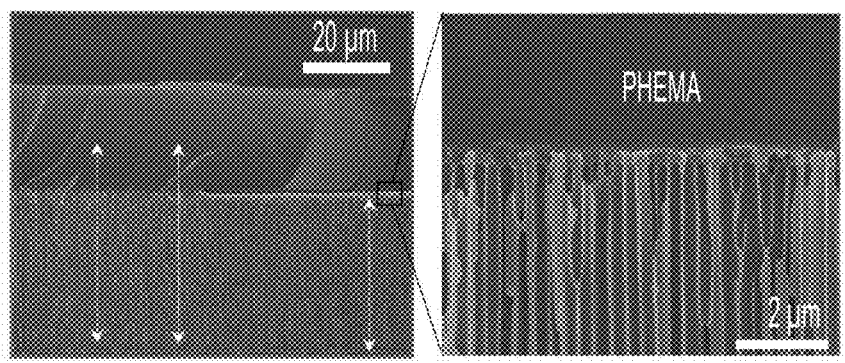
Figures 14E, 14F:
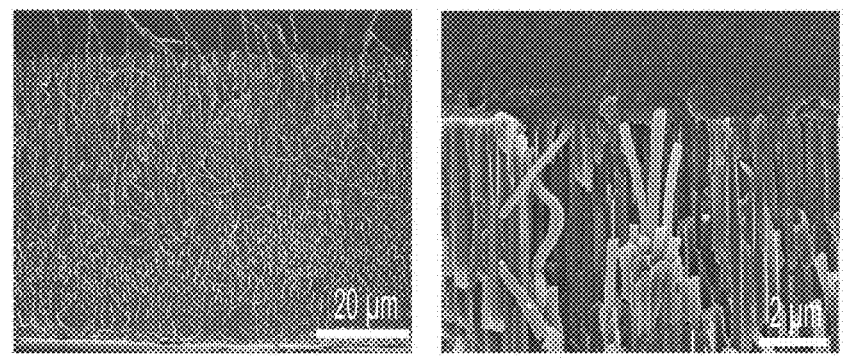

FIG. 14 shows SEM images of mesh-type hydrogel adhesives gluing two AAO membranes together. (a) A freestanding PHEMA membrane adhesive (500 µm in diameter and thickness through holes), is used to glue two AAO membranes. (b) A close-up SEM image of (a). (c) Cross-sectional view SEM image of the contact interface, clearly showing intact AAO nanochannels. The large microscale holes in the adhesive layer will ensure fluid transport through the AAO membrane without significant blockage. (d) The maximum depth to which the PHEMA gel is able to penetrate into AAO membrane is less than 100 nm, allowing for preservation of the nanochannels in the AAO membrane. (e-f) Contamination of the AAO nanochannels by commercial superglues. (f) Magnification of (e).

Figure 15A:
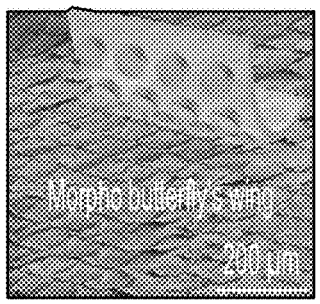
Figure 15B:
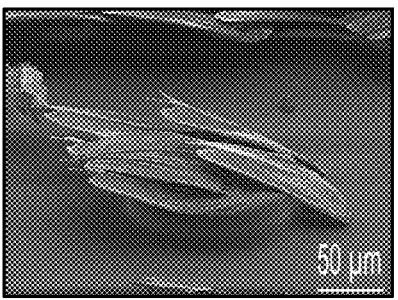
Figure 15C:
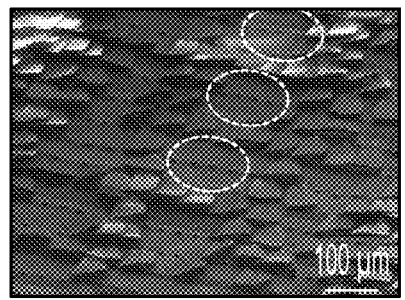

FIG. 15 shows selective adhesion and detachment of butterfly wing scales using a patterned hydrogel pad. (a) Optical microscope image of Morpho Didius butterfly wing scales with an overlaid schematic of a hydrogel adhesive pad with a square array of dot patterns (diameter, 150 µm, spacing 300 µm, and height, 50 µm). Controlling the geometry of the contacting adhesive area allows for the selective detachment of scales from a morpho butterfly's wing. (b) SEM image showing the selectively detached scales adhere only to the dot patterns. (c) Optical microscope image of the morpho butterfly wing post-removal of the scales. The white dashed circles indicating the area of the wing previously in contact with the adhesive dots before their removal.

DETAILED DESCRIPTION OF ILLUSTRATIVE EMBODIMENTS

In some embodiments, the inventions concerns adhesives comprising a polymer network that can dramatically switch the elastic modulus in two different states, yet with negligible residual stress. Such polymer networks include one or both of (i) poly(2-hydroxyethyl methacrylate) (PHEMA) hydrogel and its copolymers and (ii) shape memory polymers. For example, PHEMA can be crosslinked to the degree such that it is soft enough (~100 kPa, near the tackiness criteria) to ensure near-surface compliance and undergoes low-energy deformation for intimate contact with a rough target surface in its wet state. Upon dehydration, the gel shrinks but with negligible residual stress; meanwhile, the Young's modulus increased by 3 orders of magnitude to 2.3 GPa, allowing for topographic interlocking with the target. The adapted configuration can be retained even after forced detachment engendered by the hardened PHEMA. When rehydrated, the hydrogel pad can return to its original flat shape to release the small stored elastic energy (i.e., shape memory effect) for self-detachment from the target surface, adding benefits of reversibility and recoverability. PHEMA can be copolymerized with poly(methyl methacrylate) (PMMA), poly(acrylic acid), poly(methacrylic acid), poly(N, N-isopropyl acrylamide), polyethylene glycol diacrylate (PEGDA), polyethylene glycol dimethacrylate (PEGDMA). Shape memory polymers, including bisphenol A based epoxy (such as EPON826) crosslinked by polyether amine (such as Jeffamine D-230) and decylamine, ethylvinyl acetate (EVA), polyurethane, poly(ε-caprolactone) (PCL) and poly(cyclohexyl methacrylate) (PCHMA), can satisfy the requirement listed for PHEMA hydrogels.

As used herein, the term "wet" is used to indicate that the polymer network or hydrogel is completely hydrated and equilibrated for at least a few minutes. The term "dry" indicates that essentially no visible water is observed. The polymer networks of the instant invention convert between the two elastic modulus states when wetted. Wet hydrogels typically have a Young's modulus 10-200 kPa while dry hydrogels have modulus of 100 MPa to 10 GPa.

The phrase "residual stress" means the stress present in an object in the absence of any external load or force.

In nature, it has been shown that mucus secreted by snails allows them to maintain conformal contact with the rough surfaces of rocks or trees, when they are active. Upon drying, the shear modulus of this mucus increases from 100 Pa to ~1 GPa, forming a stiff epiphragm that is interlocked with the target surface, rendering strong adhesion (see illustration in FIG. 1a). Poly(2-hydroxyethyl methacrylate) (PHEMA) hydrogel (see chemical structures in FIG. 1b) crosslinked with ethylene glycol dimethacrylate (EGDMA) also undergoes large and reversible changes in elastic modulus, E<200 kPa in the hydrated, rubbery state to 2.3 GPa in the dry, glassy state. We note that the hydrated modulus reported here is a near-surface property measured by atomic force microscopy (AFM) regardless of the crosslinker concentrations (2 vol % vs. 8 vol %, see FIG. 5) is much lower than the bulk modulus (~34.9 MPa, see discussions in Supporting Information and FIG. 6); this can be explained as a consequence of the oxygen scavenging effect near surface of the polydimethylsiloxane (PDMS) mold. The surface layer of PHEMA gel deforms readily in its hydrated state to adapt to its mating surface (i.e. shape adaption), which is subsequently locked due to a rapid increase in glass transition temperature ($T_g$) as the PHEMA gel dries, from <2° C. (hydrated state) to 104° C. (dry state). Relaxation time scales far exceed those required for drying, analogous to epiphragm formation.

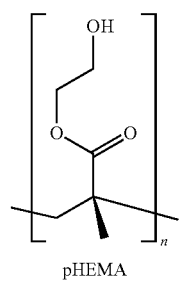

pHEMA

The unique property of the PHEMA hydrogel network allows us to create intrinsically reversible, superglue-like adhesives by combining the benefits of liquid and dry adhesives in a single material, while overcoming their respective limitations (FIG. 1c), i.e., to create a compliant solid surface that readily conforms to a rough surface such that the stored elastic energy accompanying deformation, which is proportional to the material's modulus, is minimal. This is captured by the Dahlquist criterion for tackiness, that is a solid adhesive with $E_{\mathit{eff}} \gg 100$ kPa cannot easily conform to a rough surface with the application of a modest preload (FIG. 1d). Here, we crosslink the PHEMA gel to the degree that it is soft enough to ensure near-surface compliance for intimate contact to a rough target surface in the wet state (as illustrated in FIG. 1e). Upon dehydration, the adapted configuration is locked and retained even after forced detachment due to PHEMA's high elastic modulus (see FIG. 1e). When rehydrated, the hydrogel pad can return to its original flat shape to release the stored elastic energy (i.e., shape memory effect) for self-detachment from the target surface, adding benefits of reversibility and recoverability.

To quantitatively investigate the adhesion mechanism, we performed indentation tests (contact radius a ~150 μm) on PHEMA films coated on glass substrates in four configurations: (i) the pristine, dry and stiff flat surface (FIG. 2a and FIG. 7), (ii) the hydrated and compliant, flat surface (FIG. 2b and FIG. 8), (iii) in-situ drying of the hydrated gel with the indenter pressed into the sample under a 100 mN applied preload, followed by indenter retraction to observe shape adaptation (FIG. 2c and FIG. 9), and (iv) after indenter separation in (iii) to repeat indentation on the same spot (i.e., dent) (FIG. 2d). The maximum pull-off forces required to separate the indenter from the respective samples are plotted in FIG. 2a-d. For both samples (i) and (iv), the pull-off forces were very small—with a barely measurable value (<<1 mN, FIG. 7), while those for (ii) were somewhat larger, ~4.43±0.57 mN (FIG. 8). Nevertheless, indentation caused no lasting deformation of the PHEMA samples after testing. In striking contrast, the pull-off forces for samples (iii) were much greater, ~232.05±24.41 mN (FIG. 9). Examination of the post-indented sample revealed a residual dent on the sample surface as shown in FIG. 2c, complementary to the shape of the indenter. Evidently, in the hydrated state, the solid gel behaves like liquid—it easily conforms to a target surface as a result of the near-surface soft layer. Upon drying, the gel becomes increasingly glassy and retains this adapted shape, permitting interlocking with the target surface with a relatively small, residual stress corresponding to rather small overall shrinkage (linear expansion ratio <1.5) compared to conventional hydrogel systems. Study on shape recovery kinetics upon rehydration of the PHEMA gel (FIG. 2e) confirms the shape memory effect. The liquid-like surface adaptability and shape memory effect together with a relatively small swelling/shrinkage of the PHEMA hydrogel network are key characteristics that distinguish our system from both conventional liquid glues and dry adhesives. The adaptability is further evidenced when repeating the indentation tests with a rough indenter tip (root mean square roughness ~1.8 μm), showing more variable and somewhat reduced yet comparable pull-forces (135.80±39.60 mN, see FIG. 20 to that from the smooth tip (FIG. 2c), and a dent that is complementary to the rough targets (FIG. 20. Repeated indentation tests (up to 12 cycles with various wetting and drying times) on the same spot of the sample confirm the reversibility of adhesion (see Table 51).

Negligible adhesion from samples (i) and (iv) can be attributed to the lack of conformal contact between two stiff bodies, the indenter and the dry PHEMA gel. In contrast, the pull-off force increased by nearly a factor of fifty between samples (ii) and (iii). Indentation of samples (ii) in the soft, hydrated state is interpreted using the Johnson-Kendall-Roberts (JKR) model given that deformation of the gel is reversible. Accordingly, the pull-off force, $F_{wet}$, is $$F_{wet}3/2\pi RW_{wet} \quad (1)$$

where R (~3.025 mm) is the radius of the indenter and $W_{wet}$ is the work of adhesion between the indenter and the hydrated sample. In Supporting Information and FIG. 8, we show that for the adhesion on hydrated samples, the effect of finite substrate thickness can be neglected. For sample iii), we approximate the deformed shape attained upon indentation in the wet state ii) as the reference un-strained configuration. Upon indenter retraction, the sample contact region (radius a) is subjected to a uniform vertical displacement. Therefore, the corresponding stress state can be approximated as that obtained upon pulling on a flat circular punch adhered to the material. The interfacial stress has a singularity at the contact edge. Applying the fracture-mechanics condition that failure occurs when energy release rate equals the work of adhesion of that interface, we predict the pull-off force, $$F_{dry}=\alpha\sqrt{8\pi a^3 EW_{dry}/(1-v^2)} \quad (2)$$

where E is the Young's modulus, v is the Poisson's ratio (here, 0.5), $W_{dry}$ is the work of adhesion between the indenter and the dried sample, and α is a correction factor for finite substrate thickness (its value is estimated to be ~1.54, see Supporting Information). The ratio of the pull-off force in the dry (iii) and wet (ii) states is $$\frac{F_{dry}}{F_{wet}} = \alpha\sqrt{\frac{32a^3 E_{dry}W_{dry}}{9\pi(1-v^2)W_{wet}^2 R^2}} \quad (3)$$

If we assume $W_{dry}$ and $W_{wet}$ have similar values, say, 300 mJ m$^{-2}$, Eq. (3) predicts that the post-dried, pull-off force will be about 100 times greater than that under wet conditions. Alternatively, we can use Eqs (1) and (2) to estimate work of adhesion, obtaining $W_{wet}$ ~300 mJ m$^{-2}$ and $W_{dry}$ ~80 mJ m$^{-2}$, respectively.

Figure 3B:
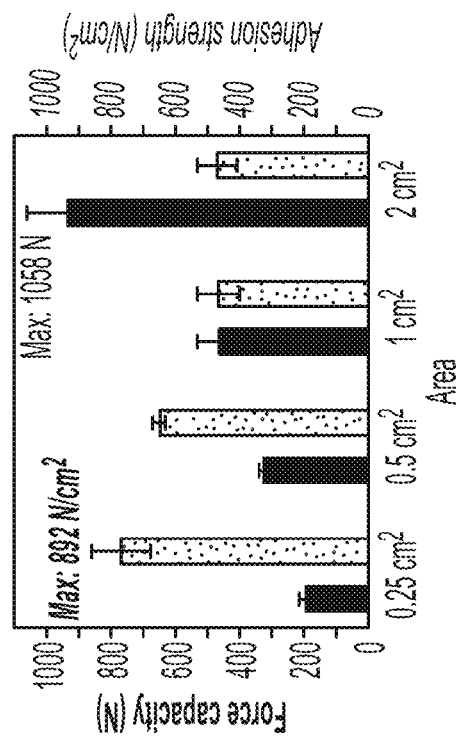
FIG. 3 demonstrates the superglue-like adhesion and scalability of the PHEMA hydrogel pads. (a) Illustration of the double-lap test setup. The PHEMA hydrogel adhesive pads fabricated on Si wafers (as backbones) are applied to both sides of a metal plate, which is then bonded to double-lap Kevlar® tapes (as tendons) to minimize opening and torsional modes for reliable measurement of the high shear adhesion. (b) The maximum force capacity of various sample sizes. (c) Graphs delineating various extrinsic and intrinsic strategies reported in literature, to modulate elastic moduli. Note that, for extrinsic strategies, adhesion performances are highly coupled to the design of surface textures. The black and red dotted lines approximately delineate the tacky (~<0.1 MPa) and non-tacky regimes according to the Dahlquist criterion, for both extrinsic and intrinsic strategies, respectively. (d) Comparison of the scalability of adhesion strength of various reversible adhesives reported in literature vs. our PHEMA hydrogel pad. The dotted lines for guides for the eyes to show different regimes of adhesion strength and force capacity.
Figure 3A:
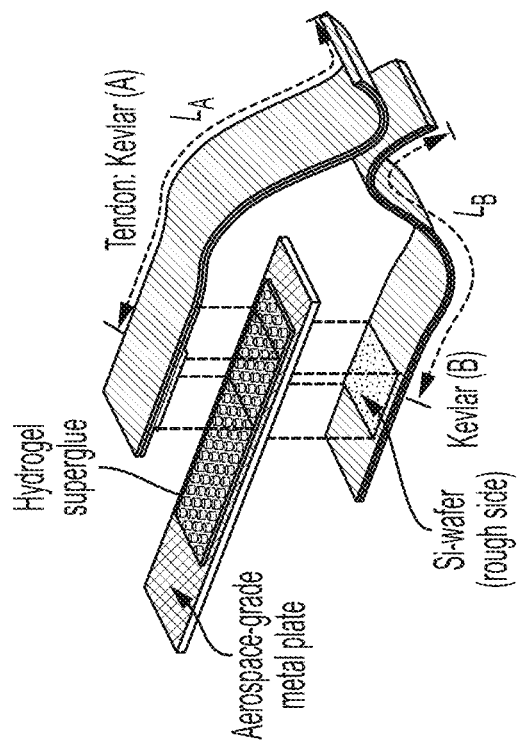
Figure 3D:
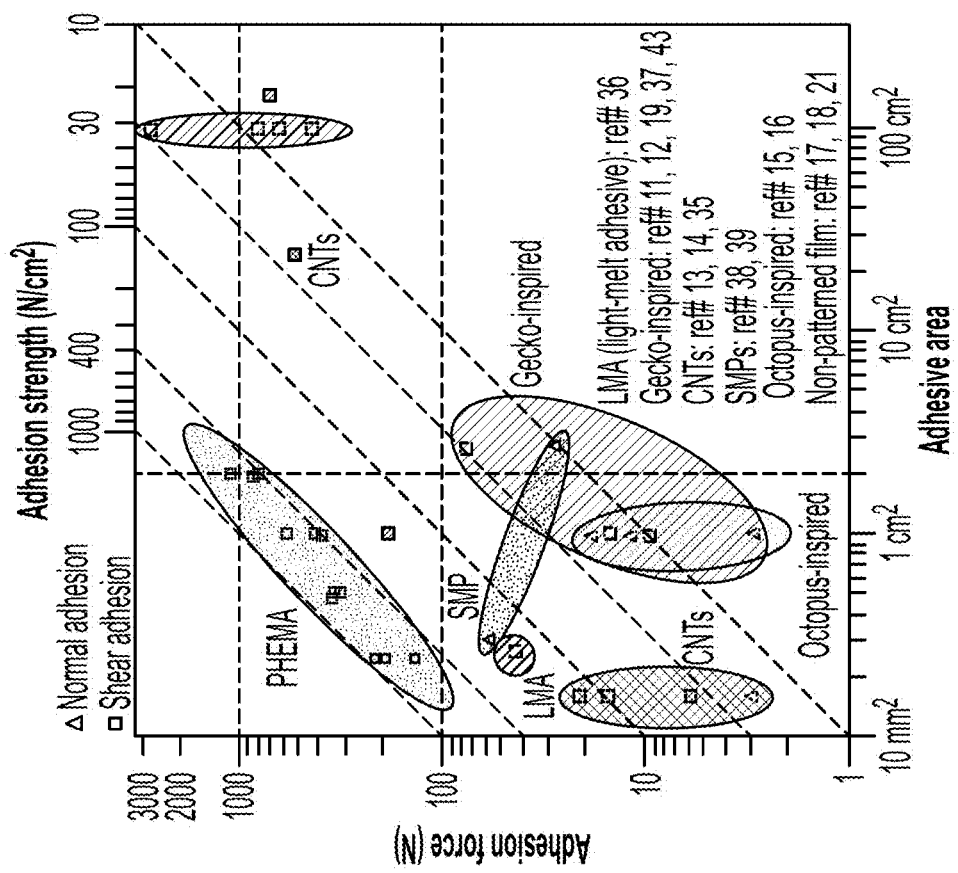
Figure 3C:
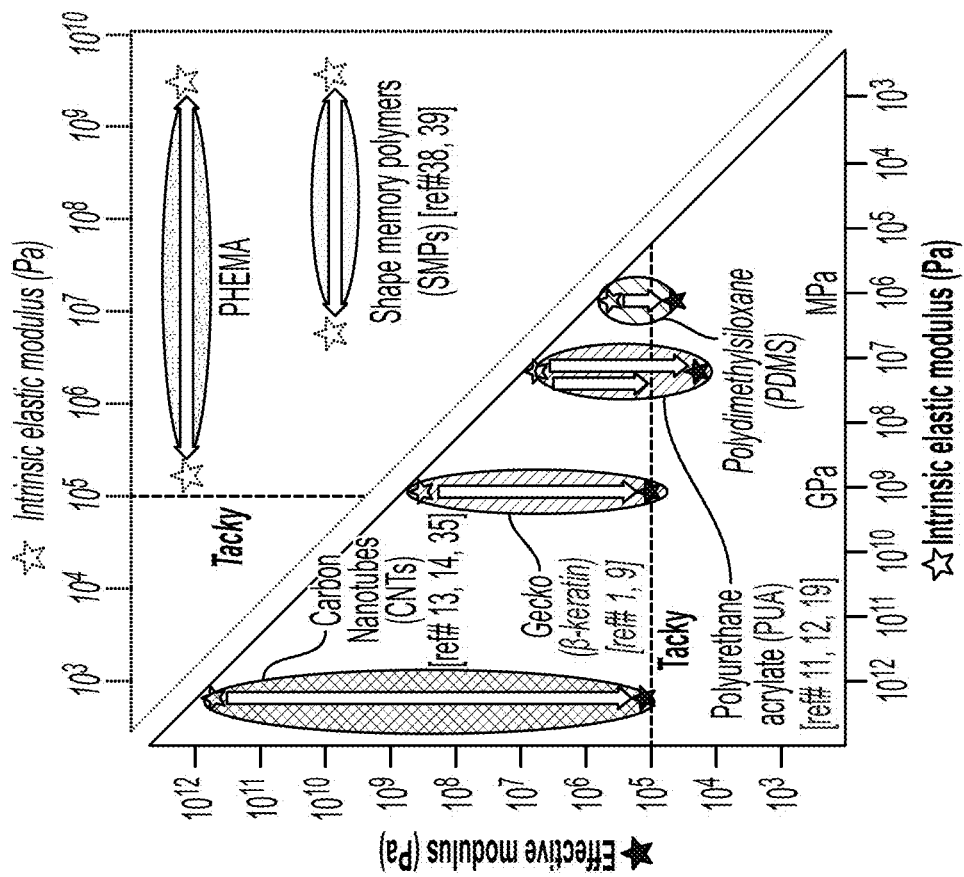
Figure 11A:
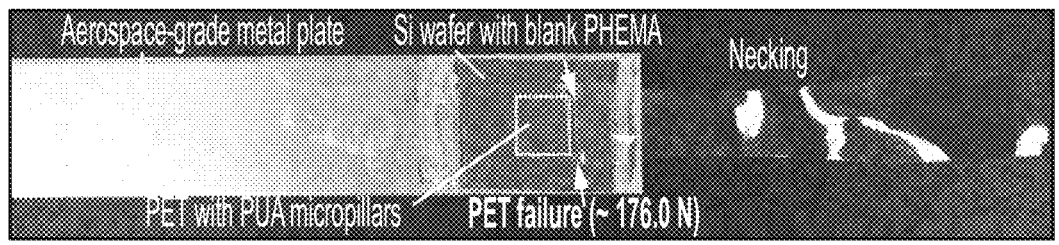
Figure 11B:
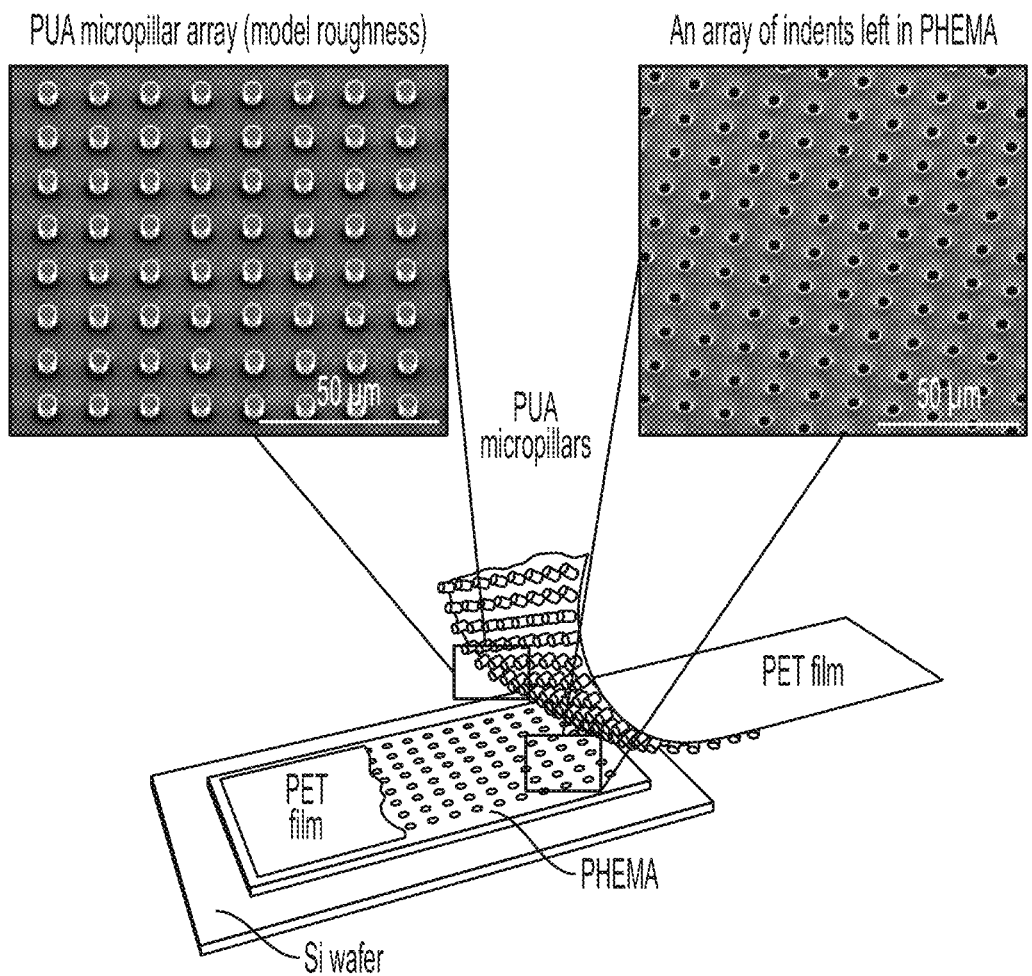

To demonstrate the utility and scalability of our PHEMA hydrogel pad as a superstrong yet reversible adhesive, we designed a double-lap jointed adhesive system consisting of the hydrogel pad on a silicon wafer as the backbone, which is then attached to a Kevlar tape that serves as a tendon (see FIG. 3a and the related discussions in Supporting Information). Such engineering design is important because commonly used backbones such as polyethylene terephthalate (PET) films cannot sustain the large tensile forces in our system, that would otherwise lead to the failure of the backbone (>200 N). To justify this claim, we prepared a shear adhesion test system comprising of a model 'rough' target surface in the form a polyurethane acrylate (PUA) micropillar array (height and diameter, 5 μm; spacing, 10 μm) supported on a PET backing layer in adhesive contact with a PHEMA film on a Si backing layer, which was then mounted on an aluminum strip. Both plastic deformation and fracture were observed in the PET film at ~176 N while the interface of PHEMA and PUA and bulk of the PHEMA adhesive layer remained unaffected (see FIG. 10 and FIG. 11a). FIG. 11b provides further evidence of shape adaptation and shape memory of our PHEMA adhesive. Forcible detachment of the rough target from the PHEMA film reveals an array of dented holes left behind in the latter, which are complementary to the PUA micropillar array. In comparison, tensile tests performed on Kevlar tendons of the same dimension as those utilized in our shear adhesion test setup, suggest that Kevlar can sustain a much higher force capacity (up to 1,100 N of in-plane tensile force; as shown in FIG. 12) than PET, and are therefore appropriate for our study. The measured shear adhesion from PHEMA samples of four different sizes (0.25, 0.5, 1, and 2 cm$^2$) is presented in FIG. 3b and FIG. 13. We highlight the highest shear adhesion strength measured, 892 N cm' from a 0.25 cm$^2$ sample, comparable with values from superglue, and the largest shear adhesion force of 1,058 N from the 2 cm$^2$ sample. We have successfully demonstrated support of an adult human subject (~87 kg) from two 2 cm² samples. The adhesion values are far superior to those obtained from samples with either extrinsic (via structuring) or intrinsic reversibility (see comparison in FIGS. 3c and 3d). In the case of fibrillar adhesives, they adhere to a target surface using short-range dispersive interactions and leverage hierarchical, slanted, high-aspect-ratio fibrillar structures, which effectively reduce the moduli of intrinsically rigid materials to the degree of self-tack (see dashed lines in FIG. 3c approximately delineating the tacky regime according to Dahlquist's criterion), while taking advantage of the near-surface pad geometry through the contact splitting mechanism. Despite the extensive engineering of bio-inspired dry adhesive pads over the last decade, their adhesion strength pales in comparison to liquid-based superglues: typically on the order of tens of N cm$^{-2}$ from structured polymers and ~100-143 N cm$^{-2}$ from carbon nanotube (CNT) bundles (FIG. 3d). Higher adhesion strength has been reported from light-melting adhesives (LMA, <160 N cm$^{-2}$) and wetting and drying of polythiophene nanotubules (~174 N cm$^{-2}$). By leveraging the intrinsic modulus change in shape memory polymers (SMPs) near $T_g$, a high adhesion strength, up to ~180 N cm$^{-2}$, has been demonstrated. However, due to the lack of conformability (the modulus for contact, ~10 MPa, which is two orders of magnitude higher than the near-surface modulus in our system), a steep, negative slope in adhesion strength (5-30 N cm$^{-2}$) is observed upon scaling up. This is a common issue in structured adhesives as more defects appear over a larger area, and thus, initiating more random cracks. In sharp contrast, our PHEMA hydrogel pads demonstrate (i) an order of magnitude increment in adhesion force capacity (~1000 N) even with a small sample size (~2 cm²) whereas most literature values are lower than 100 N, and (ii) a superior, positive size-scaling slope (adhesion force vs. sample area) compared to negative slopes in most structured dry adhesives including the gecko system.

Figure 4A:
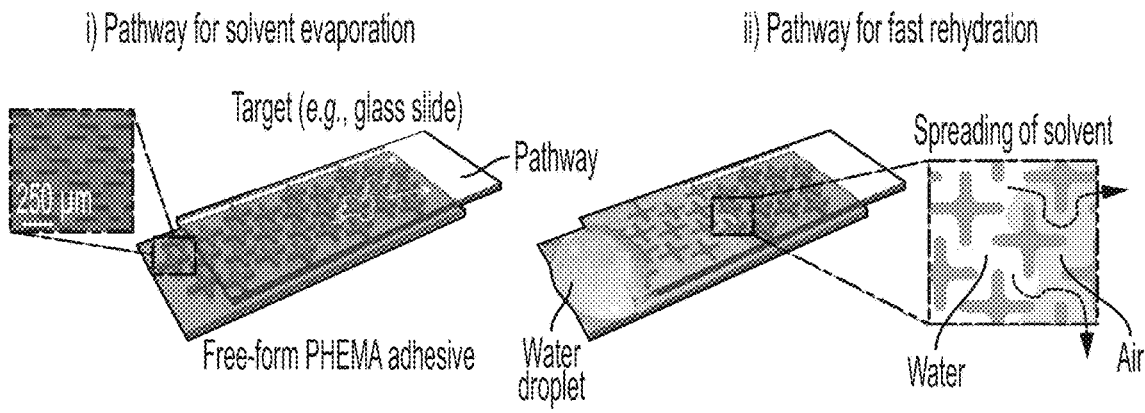
FIG. 4 presents exemplary demonstrations of the advances of patterned PHEMA hydrogel adhesive pads. (a) Schematic of a cross-pattern design as a continuous pathway to facilitate the rapid diffusion of water within the pad. Inset: Scanning electron microscopy (SEM) image of the cross-pattern in PHEMA pad. (b) Optical microscope images showing the release of the glued PHEMA gel from the glass target upon rehydration. The red dashed lines indicate the receding contact line. (c) Illustration of a hydrogel superglue mesh sandwiched between two nanoporous anodic aluminum oxide (AAO) membranes. The clear through holes (500 µm diameter) in the PHEMA mesh keep porous pathways open even after gluing. (d-e) Cross-sectional SEM images of the AAO membrane with unblocked nanopores (200 nm in diameter) in the regions in contact with PHEMA mesh pad (d) and with infiltrated liquid superglue (Gorilla® superglue) after curing (e). A false yellow color is added to aid the eyes.
Figure 4B:
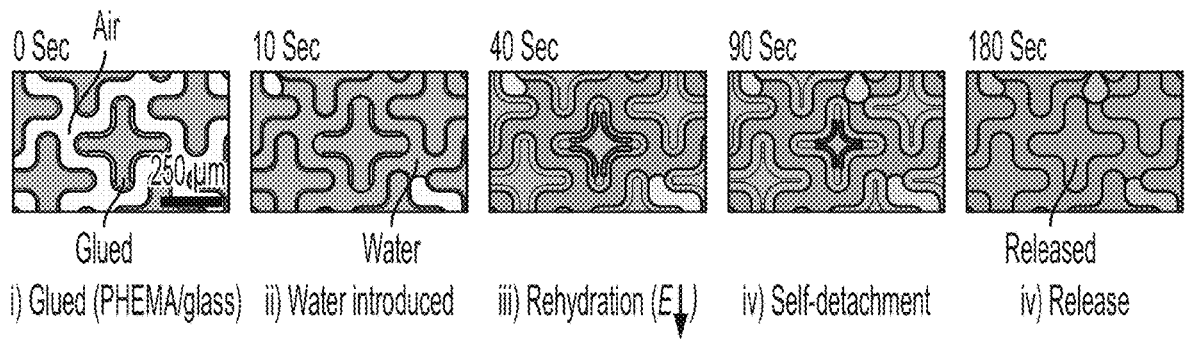
Figure 4C:
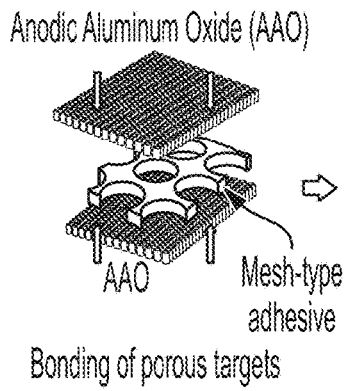
Figures 4D, 4E:
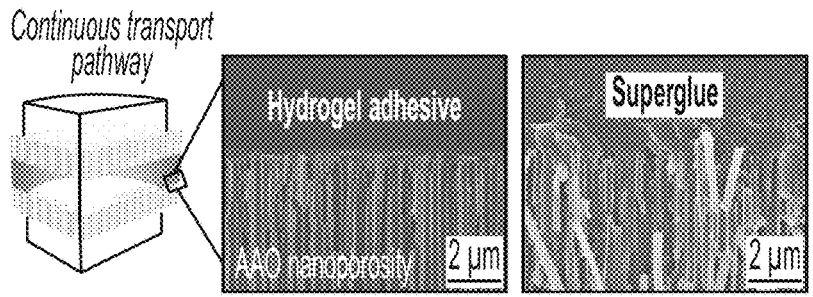

Since the adhesion force is not determined by structures in our hydrogel pads, it affords us additional flexibility to incorporate structural designs for other functionalities. As shown in FIG. 4a-b, we fabricate a cross-pattern to facilitate water diffusion in and out of the hydrogel pad. Upon rehydration, it only takes 170 s for the initially locked PHEMA pad to self-release from the glass slide (see FIG. 4b). We also prepare a PHEMA mesh with through holes (500 μm in diameter) to glue two nanoporous anodic alumina oxide (AAO) membranes, which are commonly used as filters (FIG. 4c). Fluid can freely transport across the AAO/PHEMA gel interface due to the large pore size in the PHEMA mesh, and importantly, there is no hydrogel in the nanochannels of the AAO membrane to block the channels (see FIG. 4d). This is because the crosslinked network has nearly-infinite molecular weight and therefore, individual chains cannot freely infiltrate the channels as with liquid adhesives (colored yellow in FIG. 4e and FIG. 14). Last, we show the selective detachment of morpho butterfly wing scales using a patterned PHEMA gel pad without damaging the delicate scales that have hierarchical structures (FIG. 15), a task that would otherwise be impossible using liquid glues, further supporting the importance of low near-surface modulus during contact.

In our indentation tests to measure adhesion, we applied a saturating pre-load to provide adequate near-surface deformation for the subsequent interlocking (upon drying); the applied preload, to a certain extent, determines the degree of interlocking, which is in turn limited by the degree of crosslinking and effective molecular weight of the cross-linked network. Hence, for maximum adhesion strength, the applied preload should be above a certain value (that is so called "saturating") below which the measured adhesion is reduced. Our indentation tests indicate that the applied preload in the range of 1.4-2.1 MPa can guarantee maximal adhesion force.

While not wanting to be bound by theory, interaction between the polymer system and a substrate is believed to utilize hydrogen bonds and/or van der Waals interactions.

In summary, we have presented an intrinsically reversible, superglue-like adhesive from the shape-adapting and shape memorizing PHEMA hydrogel, activated by hydration and dehydration. It features structure-independent adhesion accompanied by the strong modulation of its near-surface elastic modulus, from ~180 kPa (the hydrated state) to ~2.3 GPa (the dry state), much like the phase transition from mucus to epiphragm in snails. In turn, we demonstrate scalability in adhesion force, as opposed to most other structure-based dry adhesives. Meanwhile, our adhesive is superior to liquid-based superglues for its reversibility and non-contaminating adhesion. Importantly, since the shape-adapting adhesion presented here does not depend on the geometry of the adhesive, it will not only ease scaling-up for practical applications but also be applicable to a wide range of materials, whose elasticity can be tuned by heat, light, pH or chemical cues in local regions (e.g. at the surface layer and via patterning), with additional functionalities.

Experimental Materials and Methods

Synthesis of pHEMA hydrogel. 2-Hydroxyethylmethacrylate (HEMA) monomer (Sigma Aldrich, 98%) was mixed with 1.5 vol. % of a photoinitiator, Darocure 1173 (Sigma Aldrich, 97%) and exposed to ultraviolet (UV) light (365 nm, 500 mJ/cm²) for 10 s intervals and for a total of 1.5 minutes to obtain a partially polymerized, viscous precursor. The sample was mixed between every 10 s exposure step using a vortexer (Barnstead Thermolyne Type 16715 Mixer). After allowing the solution to rest for at least 1 h and prior to molding, 2 vol % or 8 vol % of crosslinker, ethylene glycol dimethacrylate (EGDMA, Sigma Aldrich, 98%, 90-110 ppm monomethyl ether hydroquinone inhibitor), was added to the obtained viscous mixture, along with an additional 1 vol % of Darocur 1173 (Sigma Aldrich), followed by homogenization by ultrasonication (Branson 3800 Ultrasonic cleaner).

Fabrication of pedal hydrogel structures. Silicon master patterns with (i) cross-patterns (500 μm, 100 μm, and 50 μm in length, width, and thickness, respectively), (ii) circular pillars (150 μm in diameter and 50 μm in height) and (iii) circular holes (500 μm in diameter and 50 μm in depth) respectively, were placed in a petri dish and covered by a mixture of polydimethylsiloxane (PDMS) and crosslinker (10:1 wt/wt, Sylgard 184, Dow corning). The samples were cured in an oven at 70° C. for 2 h, after which the PDMS molds were peeled off from their respective master. The unpolished surface of a silicon wafer was treated with an adhesion promoter (Glass Primer, Minuta Tech.) at 4000 rpm for 30 sec and baked on a hot plate (Dataplate® Series 730) at 115° C. for 15 min. Next, the prepared PHEMA precursor was drop-cast on the primer-treated surface, and the respective PDMS moulds with the negative patterns was placed on top. Following UV-exposure at 365 nm with a dosage of 20 J cm$^{-2}$, the PDMS molds were gently peeled off to obtain the patterned PHEMA hydrogel adhesive pad.

Measurements of mechanical properties of PHEMA by atomic force microscopy (AFM). The near-surface elastic modulus of the PHEMA adhesive was characterized using an AFM (Asylum Research MFP-3D, Oxford Instruments, U.K.), wherein 0.5×0.5 µm² area (wet samples) and 25×25 µm² area (dry samples) were scanned by the AFM probe (Bruker SCANASYST-AIR and OTESPA for the wet and dry samples, respectively), in tapping mode. Values of elastic modulus were extracted from force—displacement data using Johnson-Kendall-Roberts (JKR) model and Hertz model fits for the wet and dry samples, respectively.

Pull-off force measurement by indentation. The adhesion of the sample was measured by indentation, following the procedure described by Lin et al.. The test sample was placed on an inverted optical microscope as a glass indenter tip (radius ~3.025 mm) was brought into contact using a motor. The displacement was measured with a capacitance sensor, and the force was measured with a load cell, while videography was used to confirm the contact region. In the tests, the rough surface model was simulated by using a spherical glass indenter with a root-mean-square (RMS) roughness of 1.8 µm, while the smooth model was studied using a tip of roughness ~7.7 nm. To guarantee reproducibility, all indenter tips were treated with a hydrophobic self-assembled monolayer (SAM) of n-hexadecyltrichlorosilane, following the procedure of Glassmaker et al. To verify the recovery of a sample indented to a depth of 22 µm, upon rehydration, a drop of water was added to the indented region and the sample was allowed to swell for 1 minute before the remainder of the drop was wicked away. The sample was then allowed to dry and equilibrate for 10 minutes and the dented surface was optically scanned using a laser profilometer (Zegage, Zygo Corporation). This procedure was repeated another 7 times and the dented surface region was scanned every time. Finally, the sample was completely immersed in water and allowed to sit overnight, dried and scanned. Raw surface scan data was processed in Matlab® and plotted in Mathematica® to show the completely recovery of the indented surface to flatness. To test the reversibility of our adhesive, twelve iterations of the indentation experiments were conducted at the same spot on the surface of a flat, 8 vol % PHEMA gel sample. The sample was affixed to the stage of the indentation apparatus with double-sided tape. Various wetting and drying times were tested for each cycle. In the case of the repeatability tests, the samples were not completely dried during each cycle, so as to avoid crack generation.

Sample preparation for macroscopic adhesion tests. A sample for comparison and to delineate the ease-of-failure with weaker backbone materials prior to reaching the PHEMA adhesive's maximum force capacity, employed a polyethylene terephthalate (PET) backbone with a polyurethane acrylate (PUA) micropillar array (height and diameter, 5 µm, and spacing, 10 µm) molded onto PET surface via soft lithography to serve as model roughness. To guarantee reliable measurements of high adhesion forces, aerospace-grade aluminum plates (2.5 cm×15 cm×2.5 mm, Al 7075-T6) and Kevlar® Tape strips (Fibre Glast Development Corporation, DuPont™ Kevlar® 49) were chosen as the rigid and flexible backbone elements for the tests, respectively. Bare silicon wafers were cut precisely to make samples with areas of 0.25, 0.5, 1 and 2 cm², respectively. The polished side of the bare silicon wafer pieces was attached to the Kevlar® using Gorilla® Super Glue Gel. The side with cross-patterned PHEMA pad was in turn glued to the aluminum plate using Superglue. Finally, the patterned PHEMA pad and the unpolished, rough side of the Si wafer glued to the Kevlar, were brought into contact while the PHEMA adhesive was in the wet state and contact was maintained during the subsequent drying process with the aid of a custom-made compression jig designed to exert a preload and ensure conformal contact (~5 N/cm²). The sample was dried in an oven at 70° C. for 4 h to ensure the complete dehydration of the hydrogel adhesive and measurement of the maximum attainable force capacity.

Measurement of shear adhesion with Instron. An Instron® Model 4206 Precision (max load capacity ~134.5 kN) was employed to probe the shear adhesive properties of our samples. A strain rate of 8 mm/min and a maximum load setting of 5 kN was chosen for the tests. So as to reduce the propensity for the sample to fail via opening and out-of-plane shear modes, as well as to mitigate fixture-misalignment-related failure events, the sample was held in self-aligning grips and tested in tension with a rigid lower fixture and a universally jointed upper fixture.

Adhesion between porous targets. Anodized aluminum oxide membranes (GE Healthcare Whatman™ Anodisc™ Filter Membranes, ThermoFisher Scientific) with a pore size of 200 nm in diameter, were employed as porous targets. To obtain a free-standing, PHEMA membranous adhesive with clear-through holes (thickness ~50 µm with 500 diameter pores), the PHEMA precursor synthesized as described earlier, was used in conjunction with a dewetting-based moulding technique, as delineated in literature. The swollen PHEMA membrane was sandwiched between two AAO targets and dried. A sample for comparison was prepared by applying Gorilla® superglue gel at the interface between AAO membranes. Both the PHEMA-glued and superglued samples were cleaved to image the bonded interface using a scanning electron microscope (SEM).

Selective adhesion with patterned PHEMA adhesive pads. A PHEMA adhesive pad with a circular pillar array (150 µm in diameter, 300 µm in spacing, and 50 µm in height), while in the wet state, was pressed onto the surface of a Morpho Didius butterfly wing using a jig with an applied load of 5 N, followed by drying and forcible detachment. The surfaces of the adhesive pad and the butterfly wing post-detachment were observed using a Scanning Electron Microscope (FEI Quanta 600 FEG Mark II).

Sample Selection for Indentation

Figure 5A:
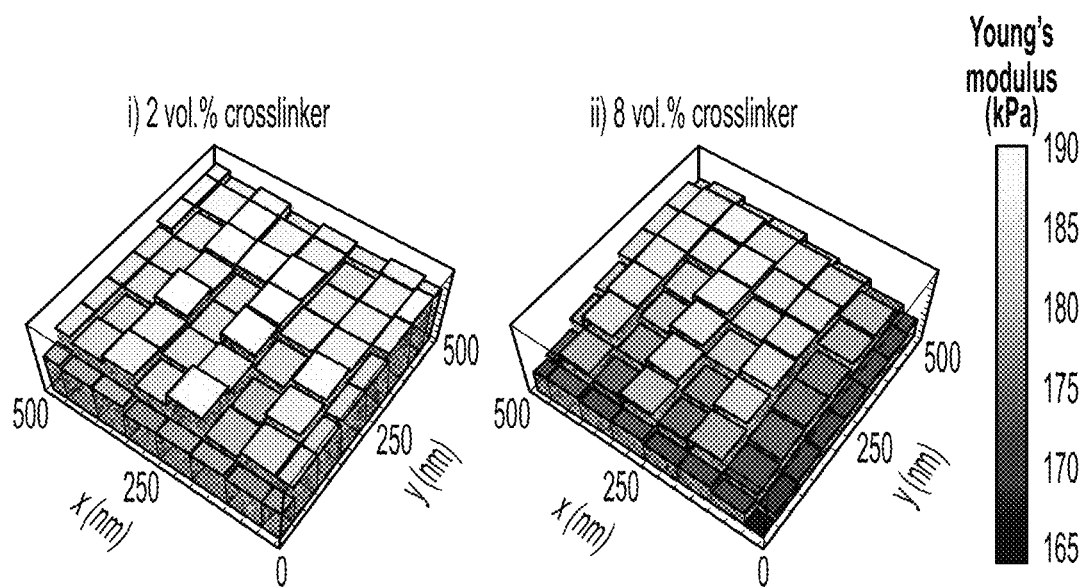
FIG. 5 presents Young's modulus of PHEMA hydrogel measured by AFM. (a-b), Near-surface elastic moduli of hydrogels in (a) wet state and (b) dry state with 2 vol % (left) and 8 vol % (right) of crosslinker, EDGMA, respectively.
Figure 5B:
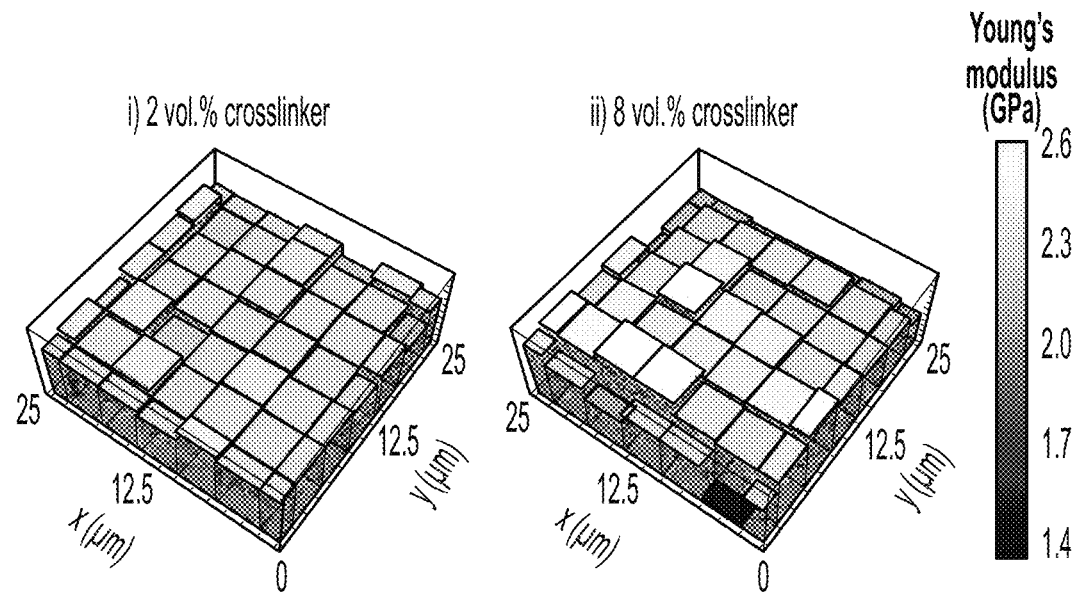
Figure 6:
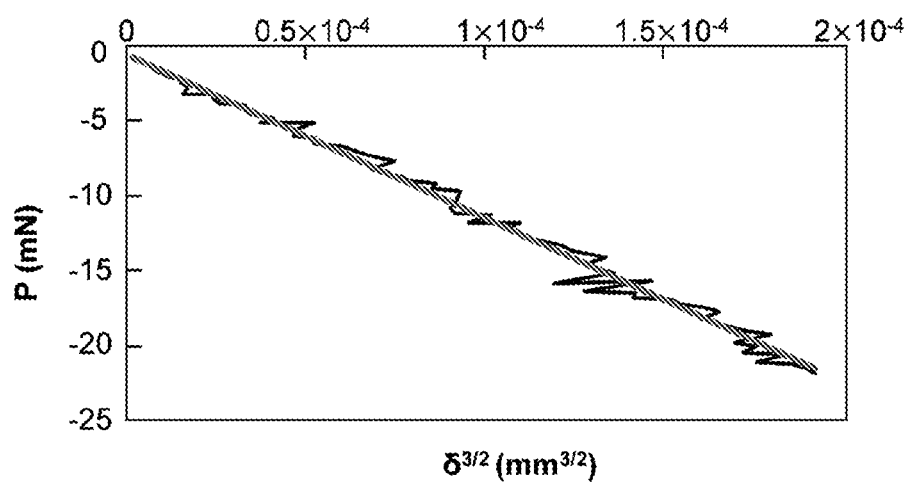
FIG. 6 presents indentation on a flat, swollen PHEMA sample crosslinked with 8 vol % EDGMA under wet conditions. The resulting normal load (P) varies linearly with deflection to the 3/2 power ($\delta^{3/2}$), suggesting that over this range the contact is Hertzian. By fitting these data to the Hertz result, $$E = \frac{9}{16\sqrt{R}} \frac{P}{\delta^{3/2}},$$

The moduli of the PHEMA hydrogel in both wet and dry states were characterized by atomic force microscopy (AFM). Samples with 2 vol % and 8 vol % of the crosslinker, EGDMA, showed similar values of moduli at hydrated (~180 kPa) and dry (~2.3 GPa) states as seen in FIG. 5. Note that the value in wet state is near-surface value due to an oxygen inhibition effect as a consequence of the samples being cured under an oxygen permeable polydimethylsiloxane (PDMS) mold. In the case of samples from 2 vol % crosslinkers, after solvent exchange to remove the uncrosslinked monomers for indentation measurement, dimples and voids are observed at the surface of the crosslinked gel due to low crosslinking density, leading to significant variability during indentation tests with an applied preload of ~100 mN. Since the hydrogels with 2 vol % and 8 vol % EDGMA showed similar near-surface moduli and our primary purpose is to understand the adhesion mechanism and tunability via a single asperity, that is modulus in the wet state vs. in the dry state, here, we chose to focus on 8 vol % samples in indentation studies. The small near-surface modulus (~180 kPa) helped make conformal contact against a rough surface despite the relatively high bulk modulus (~35 MPa, see FIG. 6 and discussion below). In the case of macroscale demonstration and measurement, we circumvented the issues in samples with 2 vol % EGDMA using a higher preload ~5 N, rendering the effect of dimples and voids negligible.

Measurement of the bulk elastic modulus of wet, 8 vol % samples.

A non-patterned PHEMA film (thickness of 125 µm) under dry and wet conditions was indented as controls with a spherical glass indenter (R 3.025 mm, FIG. 6-9). From the normal load (P) versus deflection (δ, indentation depth) curve, the Young's modulus of the hydrogel was determined. Due to the internal spring within the load cell, the displacement of the motor was greater than the displacement of the indenter during indentation. The discrepancy between the motor displacement and the indenter displacement was accounted for using the spring constant of the load cell, 1773 N/m. δ can be written as a function of P, R, and plane strain Youngs modulus (E*)(1), $$\delta^3 = \frac{9P^2}{16RE^{*2}} \tag{S1}$$

The Young's Modulus, E, of an incompressible material is related to E* through $$E^* = \frac{4E}{3} \tag{S2}$$

Combining Eqs. S1 and S2, we obtain $$E = \frac{9P}{16\sqrt{R}} \frac{P}{\delta^{3/2}} \tag{S3}$$

$\frac{P}{\delta^{3/2}}$ was calculated using the slope of P versus $\delta^{3/2}$ from the wet indentation experiment. A linear fit of the curve in FIG. 6 was used to calculate $\frac{P}{\delta^{3/2}}$ as 10,8029 mN/mm$^{3/2}$. Inputting this value in Eq. S3 yields E for a wet PHEMA film, to be 34.9 MPa.

Accounting for finite layer thickness in theoretical treatment of pull-off force. As described in the main text (Eq. 1), pull-off force during indentation in the wet state was interpreted using the Johnson-Kendall-Roberts (JKR) model (Johnson KL (1987) Contact Mechanics (Cambridge University Press)) for adhesive contact between a smooth spherical indenter and an elastic surface. Pull-off in the post-dried state was interpreted using the elastic solution for a flat punch (Eq. 2). Both equations need to be corrected if the contact radius is significantly larger than the film thickness. The relationship between energy release rate (and so the work of adhesion, W), and pull-off force, F, can be described as $$F = \sqrt{2W \frac{dA}{dC}} \tag{S4}$$

where A is the cracked area, and C is the system compliance. According to the JKR model, the corresponding relationship is (4)

$$F = F_H + \sqrt{2W \frac{dA}{dC}} \tag{S5}$$

where $F_H$ is the "Hertz" load, or the force required to achieve the same contact area without adhesion. The primary quantity to examine when considering whether and what correction needs to be made is $\frac{dA}{dC}.$ In this instance, C(A) is the compliance of a rigid punch adhered to the surface of the sample. Long et al. have provided an expression for compliance:

$$C = C_\infty \left[\frac{1}{1 + f(\eta)}\right] \text{ where} \tag{S6}$$

$$f(\eta) = \frac{1.095\,\eta + 1.3271\,\eta^2 + 0.1431\,\eta^3}{0.9717}; \eta = \frac{a}{h}; A = \pi a^2$$

Using these relations together with the measured values of contact area at pull-off and film thickness, we find that for wet indentation (FIG. 8), the value of dC/dA differs from that for a semi-infinite half space by less than 10%. Therefore, Eq. (1) was used without any correction. For post-dry pull-off (FIG. 9), the measured value of dC/dA is 0.42 times of the theoretical value calculated according to Eq. (2). Hence, predicted force is greater by a factor of 1.54.

Measurement of macroscale shear adhesion with a double-lap test setup using an Instron. This double-lap setup (FIG. 3a) was designed to resolve the issue of supporting substrate failure (e.g., the necking of a PET film, as seen in FIG. 11a) prior to that of the adhesive itself, as well as to minimize unwanted failure modes of opening and out-of-plane shear. A Kevlar tendon can sustain a much higher force capacity as shown in FIG. 12. Specifically, our double-lap shear adhesive sample was designed to reliably capture high peak forces above 140 N (even for our smallest sample with area of ~0.25 cm$^2$). As we observed, two 2 cm$^2$ samples (safety factor ~2 to minimize risks due to potential failures), which were attached to either side of a metal plate and in a double-lap configuration with the Kevlar tendons, i.e., with an active PHEMA area of 4 cm$^2$, successfully supported the weight of an adult human, ~87 kg. The double-lap configuration with Kevlar "tendons" generated force (F)—displacement (d) curves with two peaks, indicative of two distinct adhesion-failure events (FIG. 13). In an ideal scenario, when the lengths of the two Kevlar tendons are equal ($l_A=l_B$), the load is shared equally upon tensile loading in an INSTRON®, resulting in a higher value of the first peak, $F_1^{lA=lB}$ (that corresponds to the failure of the first of the two lap joints), when compared to that of the second peak, $F_2^{lA=lB}$ (e.g., 346 N from a 0.5 cm$^2$ sample), as shown in FIG. 13b. However, an unavoidable mismatch in the lengths of Kevlar tendons ($l_A \approx l_B$; $l_A \neq l_B$) forces the shorter of the two to first take up a disproportionate amount of the load, $F_1^{lA \neq lB}$. Regardless of the tendon length mismatch, following the first failure event, the test setup is less prone to opening mode failure and effectively reduces to a 'single-lap', 'single-tendon' test. Hence, the second peaks (both $F_2^{lA \approx lB}$ and $F_2^{lA \neq lB}$) provide a reasonable estimate of the strength of a single interface and is defined as the adhesion force measured in every test.

TABLE S1

Adhesive Reversibility measured via repetitive indentation at the same spot on the flat PHEMA gel

| Iteration | Maximum Pull-off Force measured (mN) | Wetting duration | Drying duration |
|---|---|---|---|
| 1 | 163.37 | Overnight | 1 h |
| 2 | 245.76 | Overnight | 1 h |
| 3 | 257.62 | 1 h 40 min | 1 h 15 min |
| 4 | 225.50 | Over a weekend | 1 h 30 min |
| 5 | 165.31 | 1 h | 1 h 8 min |
| 6 | 186.80 | Overnight | 1 h 18 min |
| 7 | 133.27 | 1 h 30 min | 1 h |
| 8 | 205.66 | Overnight | 1 h 15 min |
| 9 | 176.06 | 1 h 50 min | 1 h 18 min |
| 10 | 217.46 | Overnight | 1 h 25 min |
| 11 | 129.62 | 2 h | 1 h 27 min |
| 12 | 203.94 | Overnight | 1 h 16 min |

What is claimed:

1. An adhesive, comprising:
a polymer network wherein a change in hydration of the polymer network effects conversion of the network between two different elastic modulus states with essentially no residual stress evolved in conversion between the two different elastic modulus states,
wherein said polymer network (i) comprises a shape memory polymer and (ii) optionally comprises poly (2-hydroxyethyl methacrylate) (PHEMA) hydrogel and/or a copolymer thereof,
the shape memory polymer optionally comprising one or more of bisphenol A-based epoxy crosslinked by polyether amine and decylamine, ethylvinyl acetate (EVA), polyurethane, poly (&-caprolactone) (PCL) and poly (cyclohexyl methacrylate) (PCHMA) and (ii) a shape memory polymer.

2. The adhesive of claim 1, wherein the adhesive comprises PHEMA hydrogel and the PHEMA is copolymerized with one or more of poly (methyl methacrylate) (PMMA), poly (acrylic acid), poly (methacrylic acid), poly (N, N-isopropyl acrylamide), polyethylene glycol diacrylate (PEGDA), and polyethylene glycol dimethacrylate (PEGDMA).

3. The adhesive of claim 1, wherein the hydrogel, when contacted with a substrate, substantially does not have a chemical reaction with the substrate.

4. The adhesive of claim 1, further comprising a crosslinker in an amount of from about 2 vol % to about 10 vol %.

5. The adhesive of claim 4, wherein the crosslinker is ethylene glycol dimethacrylate (EGDMA).

6. An adhesive, comprising:
a polymer network wherein a change in hydration of the polymer network effects conversion of the network between two different elastic modulus states with essentially no residual stress evolved in conversion between the two different elastic modulus states,
wherein said polymer network (i) comprises poly (2-hydroxyethyl methacrylate) (PHEMA) hydrogel and/or a copolymer thereof and (ii) optionally comprises a shape memory polymer, wherein the hydrogel's modulus increases by at least three orders of magnitude when dry versus wet.

7. An adhesive, comprising:
a polymer network wherein a change in hydration of the polymer network effects conversion of the network between two different elastic modulus states with essentially no residual stress evolved in conversion between the two different elastic modulus states,
wherein said polymer network (i) comprises poly (2-hydroxyethyl methacrylate) (PHEMA) hydrogel and/or a copolymer thereof and (ii) optionally comprises a shape memory polymer,
wherein the hydrogel, when wet, has a Young's modulus of from 10 to 200 kPa and the hydrogel, when dry, has a modulus of 100 MPa to 10 GPa.

8. An adhesive, comprising:
a polymer network wherein hydration or dehydration of the polymer network effects conversion of the network between two different elastic modulus states with essentially no residual stress evolved in conversion between the two different elastic modulus states,
wherein said polymer network comprises either or both of (i) poly (2-hydroxyethyl methacrylate) (PHEMA) hydrogel and/or a copolymer thereof, and (ii) a shape memory polymer, and
wherein the hydrogel, when wet, has a Young's modulus of from 10 to 200 kPa and the hydrogel, when dry, has a modulus of 100 MPa to 10 GPa.

* * * * *